(12) United States Patent
Corn et al.

(10) Patent No.: US 11,513,261 B2
(45) Date of Patent: *Nov. 29, 2022

(54) LIGHT SOURCE LENS, ILLUMINATION UNIT, AND DISPLAY UNIT

(71) Applicant: Saturn Licensing LLC, New York, NY (US)

(72) Inventors: Roger Corn, Tokyo (JP); Yosuke Narita, Aichi (JP); Takeo Arai, Aichi (JP); Masami Sato, Chiba (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,027

(22) Filed: Jan. 14, 2022

(65) Prior Publication Data

US 2022/0179128 A1 Jun. 9, 2022

Related U.S. Application Data

(63) Continuation of application No. 17/081,009, filed on Oct. 27, 2020, now Pat. No. 11,262,483, which is a
(Continued)

(30) Foreign Application Priority Data

Mar. 31, 2015 (JP) .................................. 2015-073337

(51) Int. Cl.
*G02B 3/00* (2006.01)
*G02B 13/00* (2006.01)
(Continued)

(52) U.S. Cl.
CPC ............... *G02B 3/00* (2013.01); *G02B 13/00* (2013.01); *G02B 13/18* (2013.01); *G02B 19/00* (2013.01); *F21Y 2115/10* (2016.08)

(58) Field of Classification Search
CPC .. F21V 5/04; F21V 5/007; G02B 3/00; G02B 13/18; G02B 19/00
See application file for complete search history.

(56) References Cited

U.S. PATENT DOCUMENTS

2005/0201118 A1 9/2005 Godo
2005/0212089 A1 9/2005 Kiyomoto et al.
(Continued)

FOREIGN PATENT DOCUMENTS

CN 101479859 A 7/2009
CN 104421836 B 3/2018
(Continued)

OTHER PUBLICATIONS

International Search Report for PCT/JP2016/057164, dated Jun. 14, 2016. (4 pgs.).

*Primary Examiner* — Bryon T Gyllstrom
*Assistant Examiner* — Christopher E Dunay
(74) *Attorney, Agent, or Firm* — Richard LaPeruta

(57) ABSTRACT

An object of the present invention is to provide a light source lens that makes it possible to improve unevenness in a luminance distribution, an illumination unit, and a display unit.

A light source lens (1) according to the present disclosure includes an incident surface on which light from a light-emitting device is incident, and an exit surface (20) that has a diffusing function at a center part (21) for light incident through the incident surface as well as a light-condensing function at at least a portion of an intermediate part (22) and a peripheral part (23) for the light incident through the incident surface.

20 Claims, 27 Drawing Sheets

Related U.S. Application Data continuation of application No. 15/559,125, filed as application No. PCT/JP2016/057164 on Mar. 8, 2016, now Pat. No. 10,852,456.

(51) Int. Cl.
  *G02B 13/18* (2006.01)
  *G02B 19/00* (2006.01)
  *F21Y 115/10* (2016.01)

(56) References Cited

U.S. PATENT DOCUMENTS

| | | |
|---|---|---|
| 2006/0124835 A1 | 6/2006 | Kiyomoto et al. |
| 2008/0007966 A1* | 1/2008 | Ohkawa ................. G02B 5/045 |
| | | 362/608 |
| 2010/0259153 A1 | 10/2010 | Futami |
| 2011/0279751 A1* | 11/2011 | Iiyama ..................... F21V 5/04 |
| | | 362/335 |
| 2011/0305026 A1* | 12/2011 | Mochizuki ............ F21V 7/0091 |
| | | 362/308 |
| 2012/0032202 A1 | 2/2012 | Ogata et al. |
| 2012/0243224 A1 | 9/2012 | Kuwaharada et al. |
| 2013/0093963 A1 | 4/2013 | Kasai |
| 2013/0155690 A1* | 6/2013 | Chen ................. G02F 1/133603 |
| | | 362/335 |
| 2014/0061699 A1 | 3/2014 | Kim |
| 2014/0071657 A1 | 3/2014 | Sekiguchi et al. |
| 2014/0126206 A1 | 5/2014 | Wilcox et al. |
| 2014/0126222 A1* | 5/2014 | Wang ....................... F21V 5/04 |
| | | 362/311.09 |
| 2014/0307447 A1 | 10/2014 | Ohta et al. |
| 2014/0328069 A1* | 11/2014 | Jeong ..................... H01L 33/58 |
| | | 362/335 |
| 2016/0216561 A1* | 7/2016 | Lee .................. G02F 1/133606 |
| 2017/0234507 A1* | 8/2017 | Kang ..................... F21V 5/048 |
| | | 362/237 |
| 2018/0011375 A1* | 1/2018 | Arai ..................... G02B 5/0278 |

FOREIGN PATENT DOCUMENTS

| | | |
|---|---|---|
| JP | 2007227410 A | 9/2007 |
| JP | 5341984 B2 | 11/2013 |
| JP | 2014002328 A | 1/2014 |
| JP | 201449440 A | 3/2014 |
| WO | 0141222 A1 | 6/2001 |
| WO | 2011086652 A1 | 7/2011 |

* cited by examiner

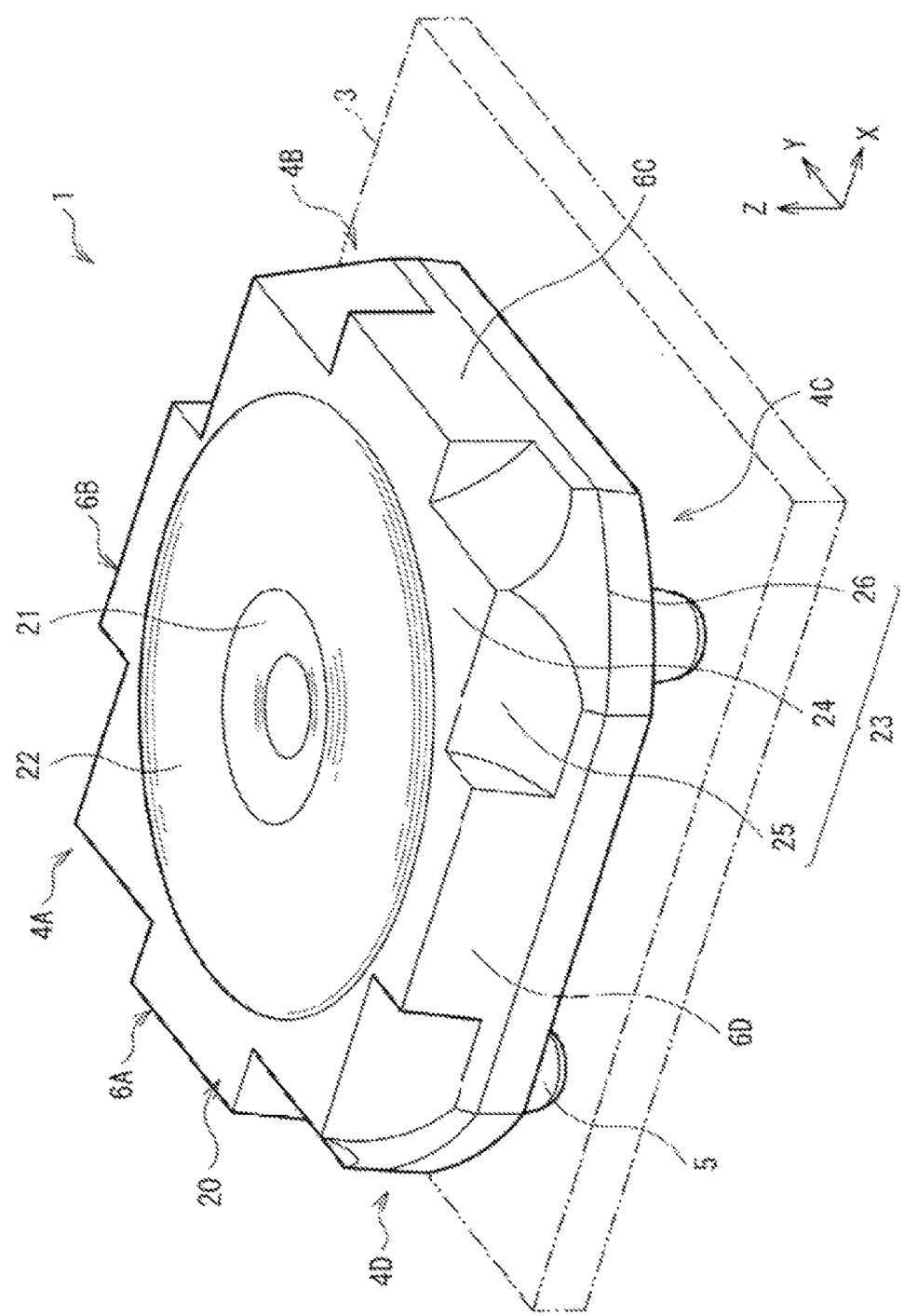
[FIG. 1]

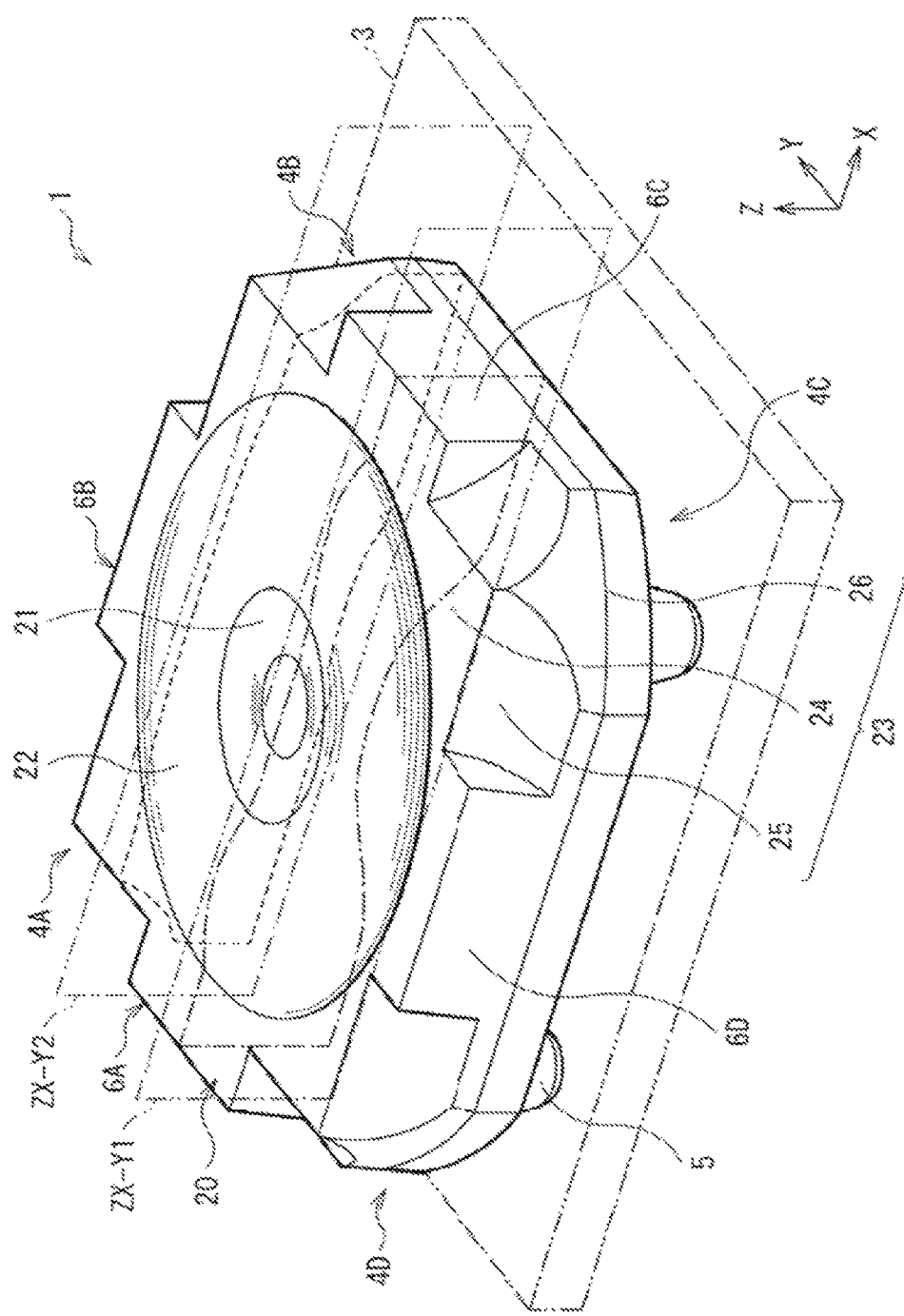
[FIG. 2]

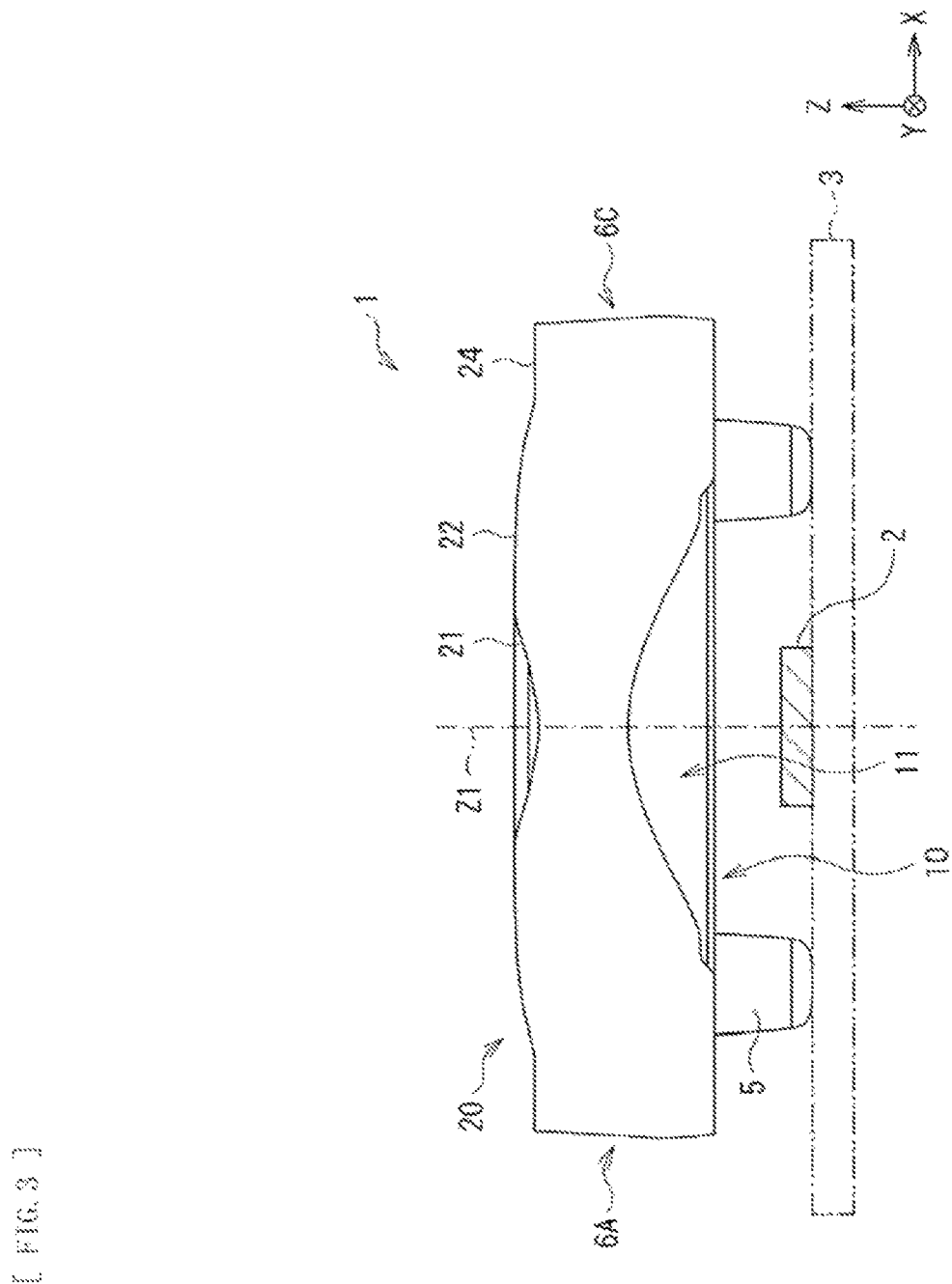

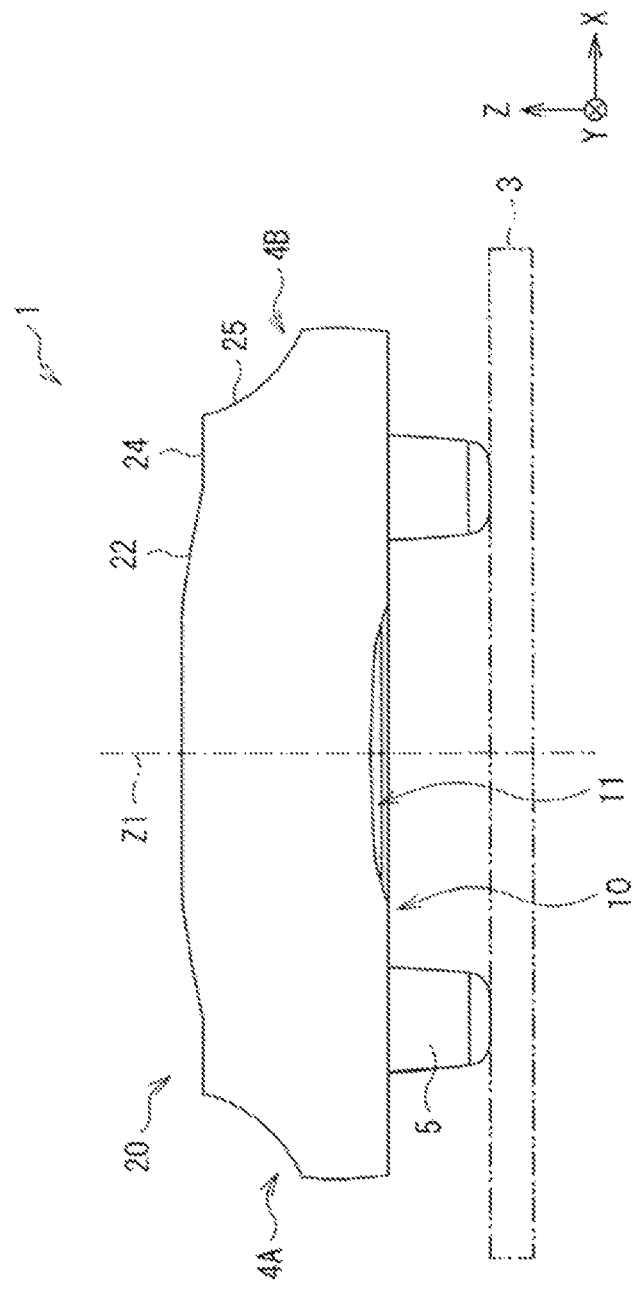

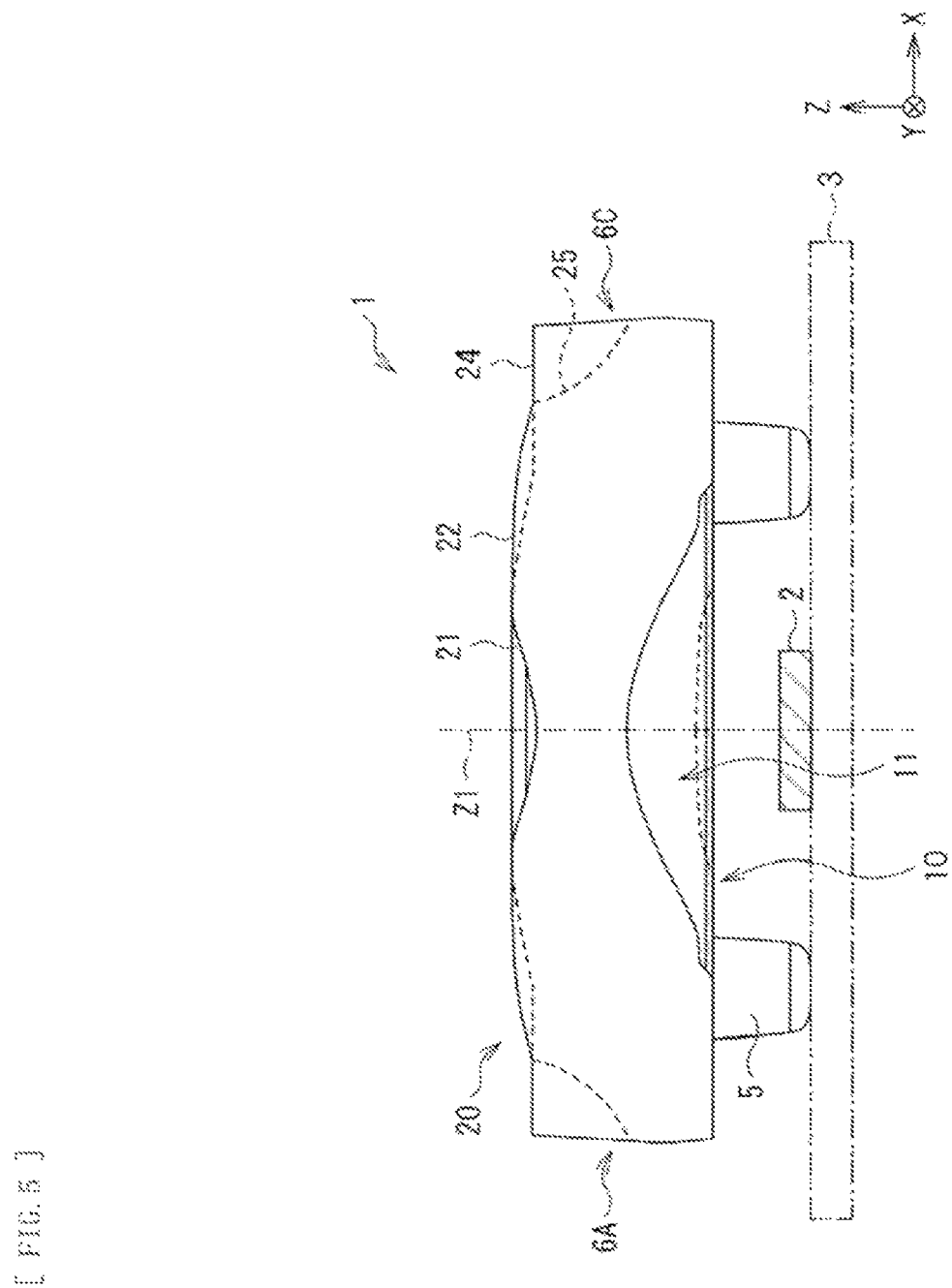
[FIG. 5]

[ FIG. 6 ]
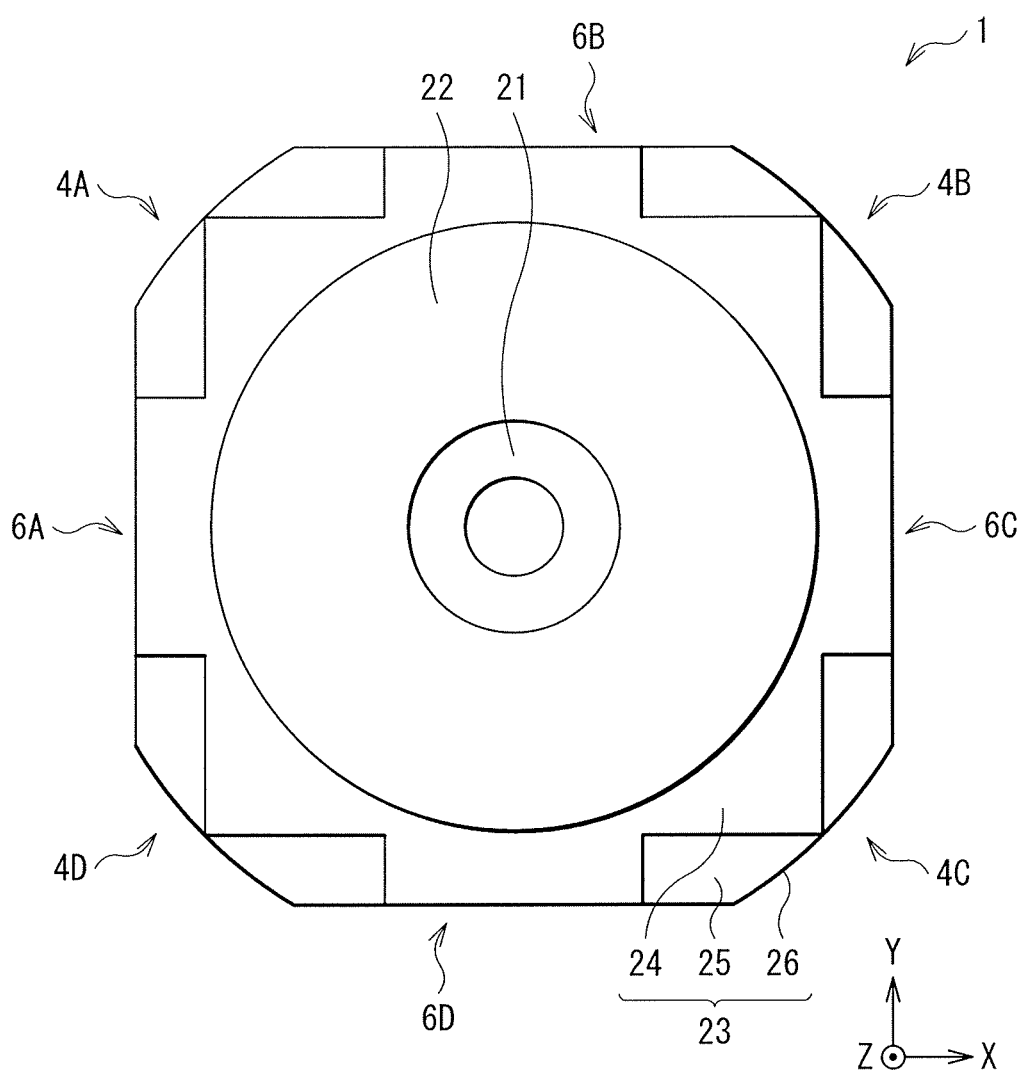

[ FIG. 7 ]
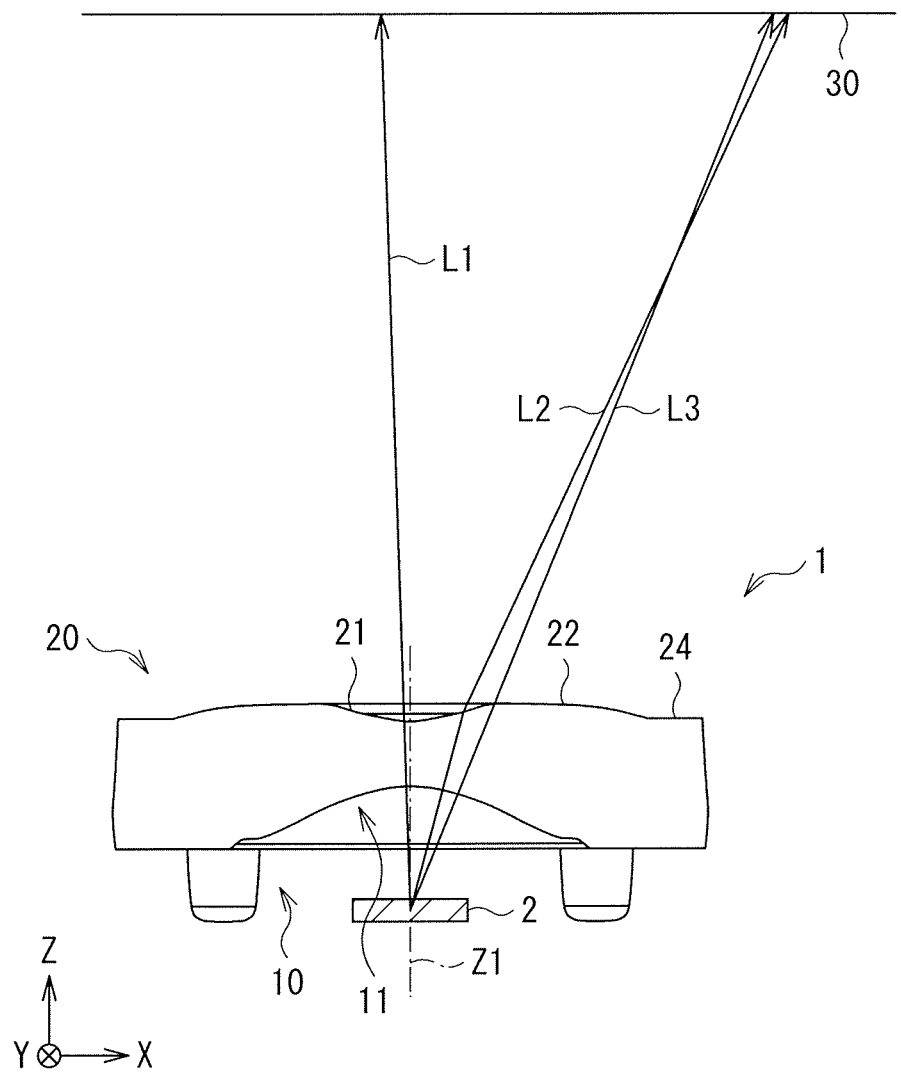

[FIG. 8]
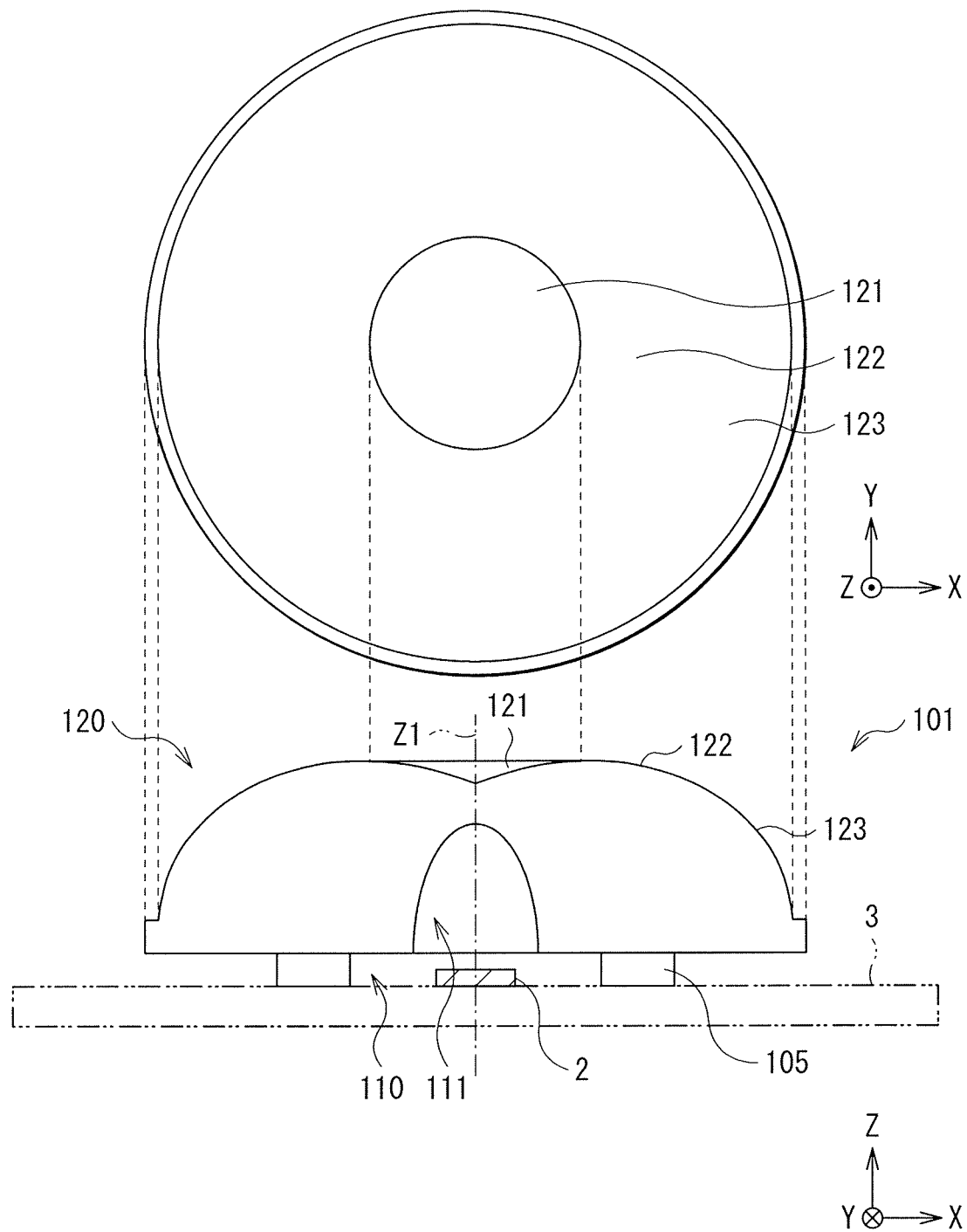

[ FIG. 9 ]
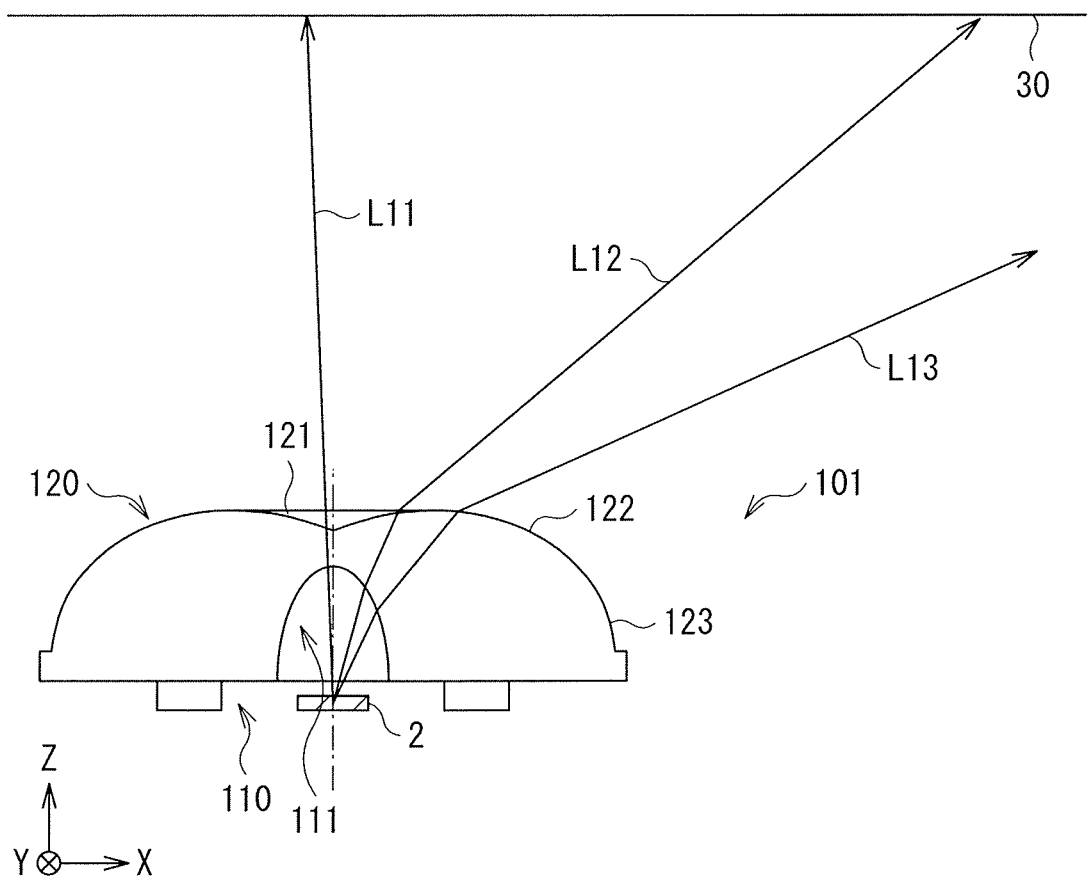

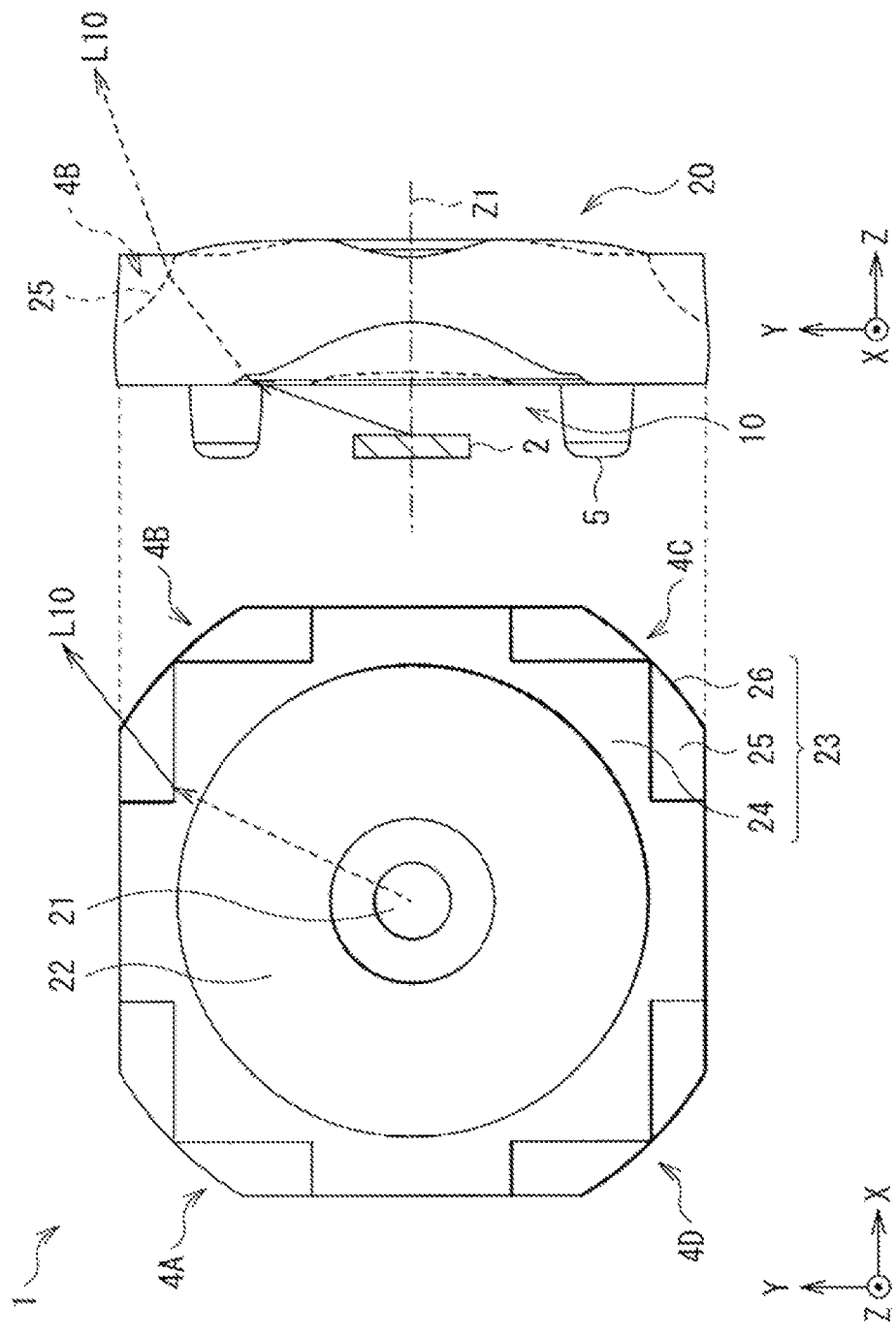
[ FIG. 10 ]

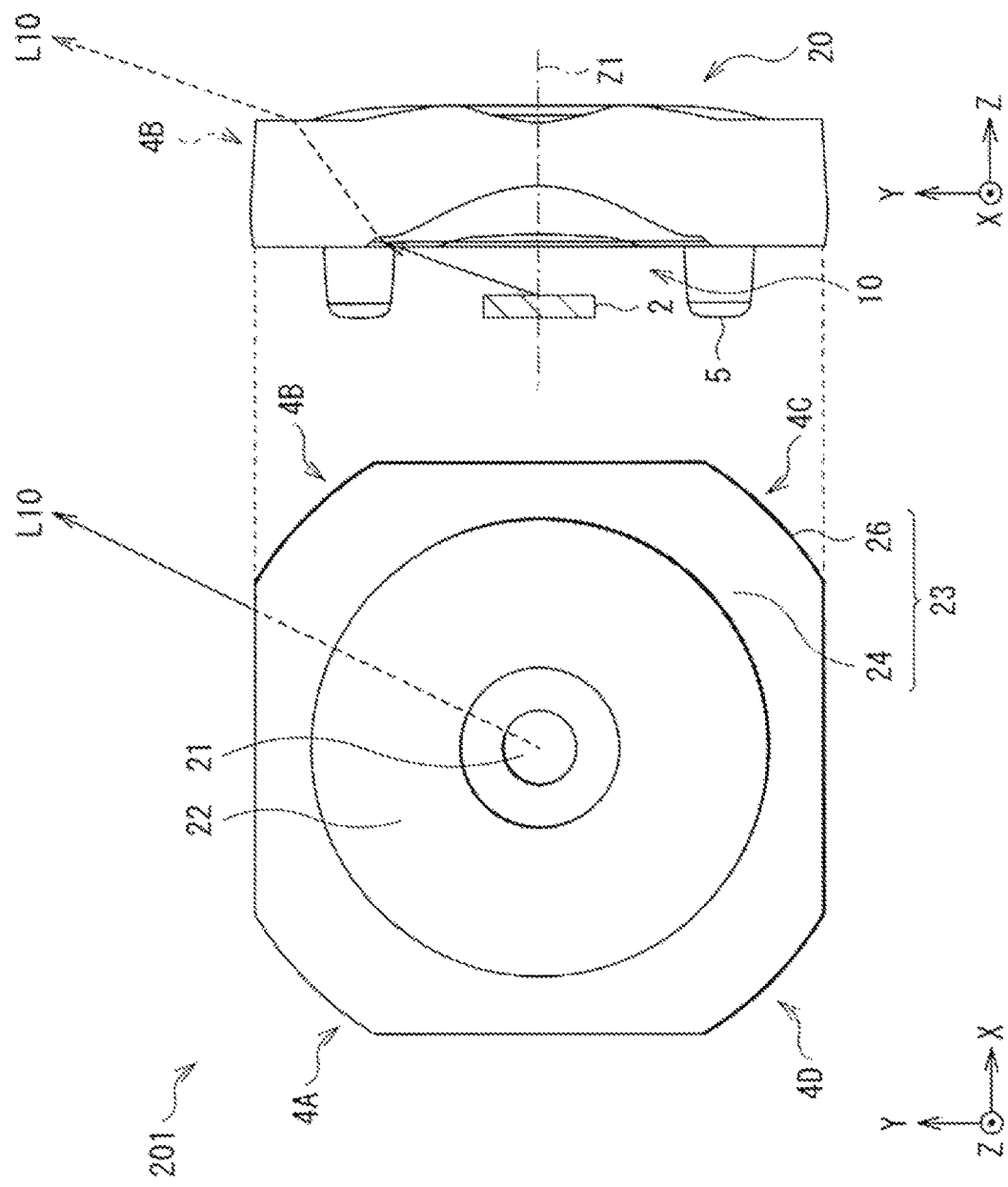

[ FIG. 12 ]
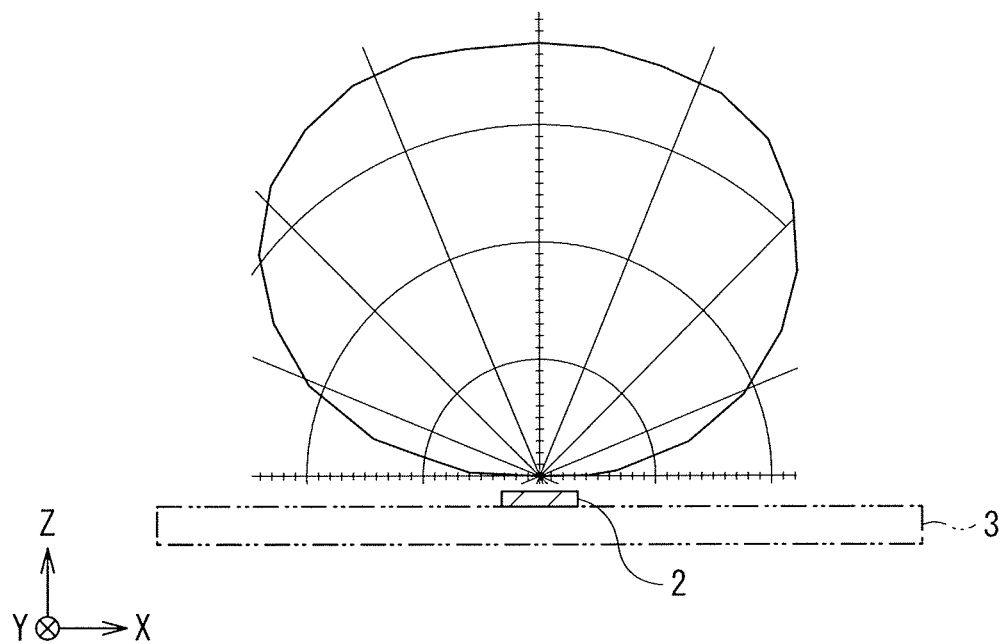
[ FIG. 13 ]
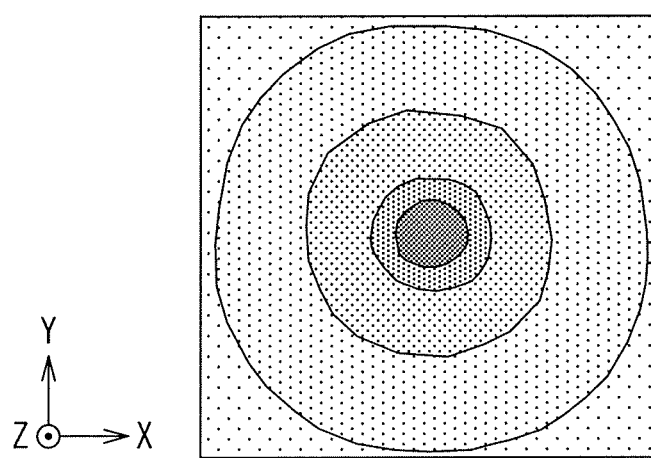

[ FIG. 14 ]
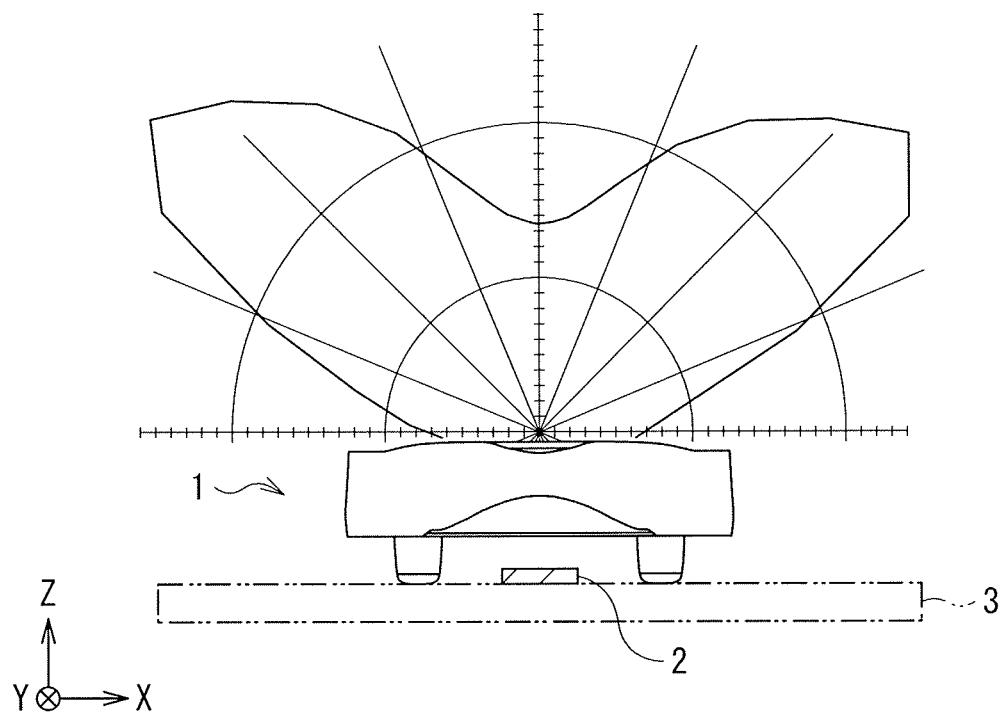
[ FIG. 15 ]
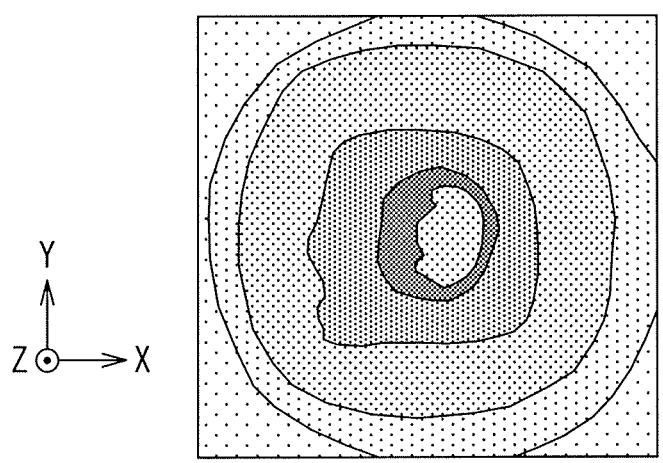

[ FIG. 16 ]
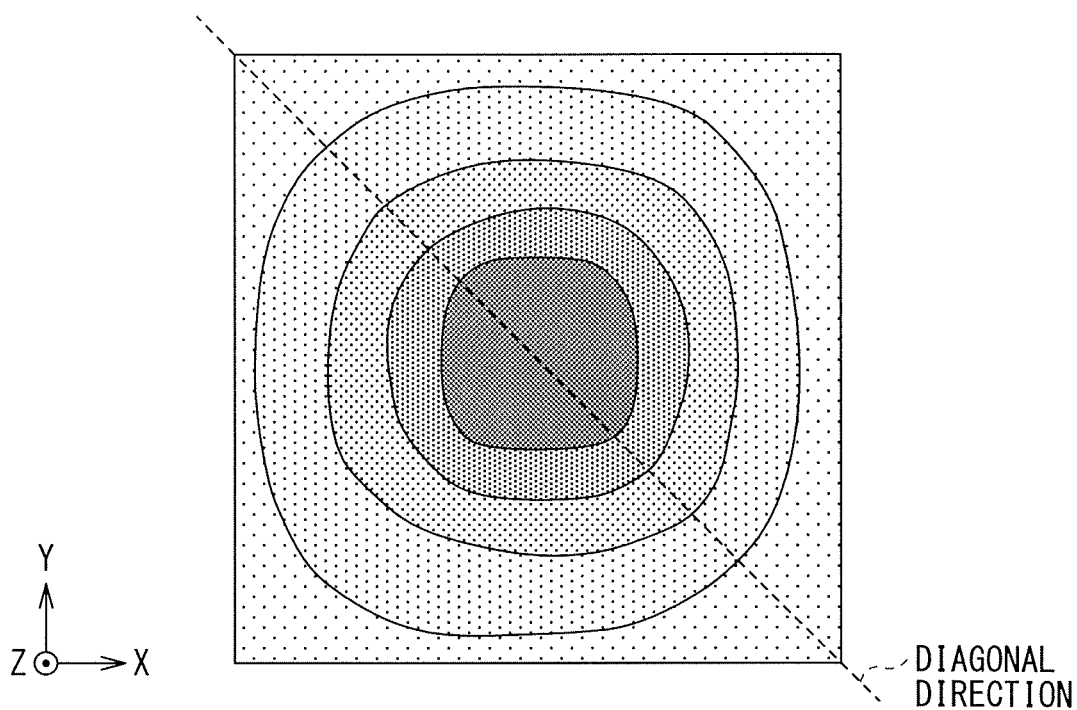
[ FIG. 17 ]
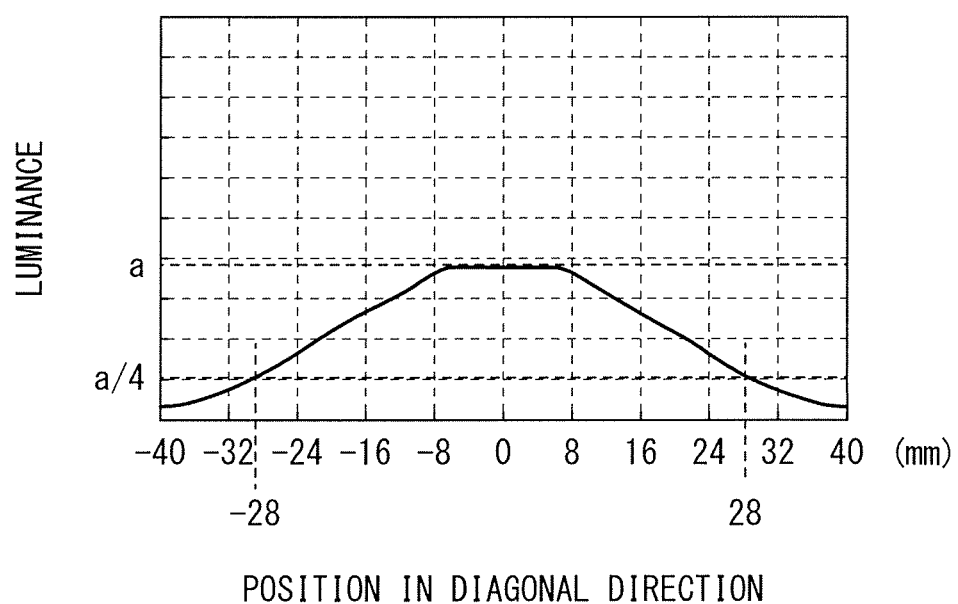

[ FIG. 18 ]
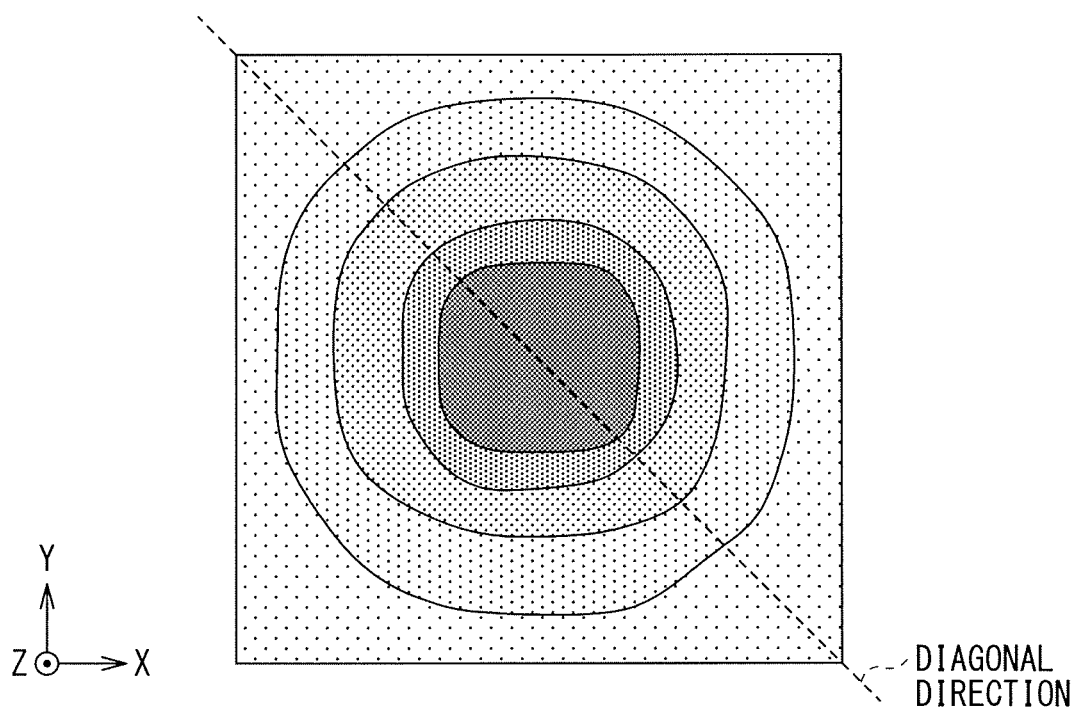
[ FIG. 19 ]
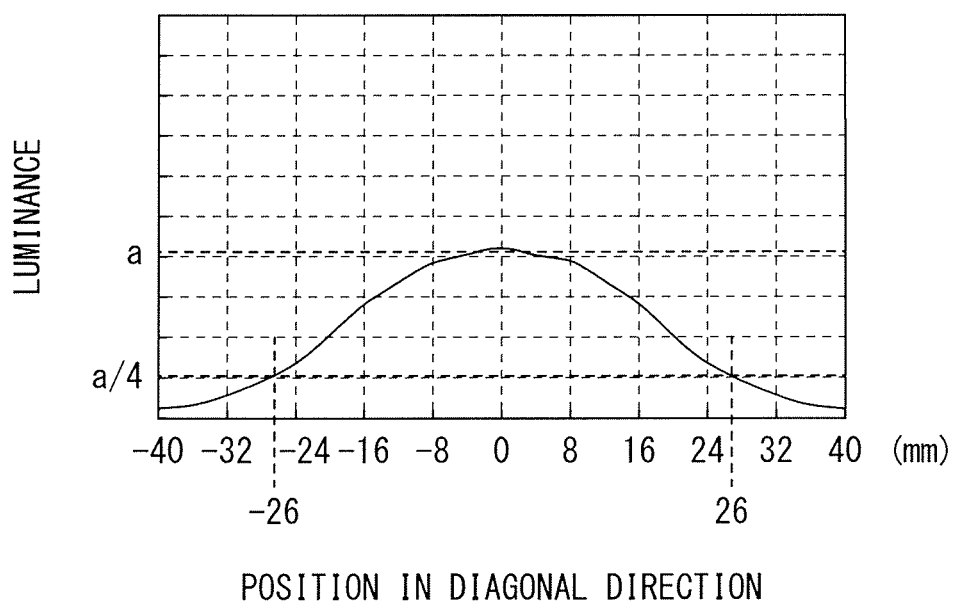

[ FIG. 20 ]
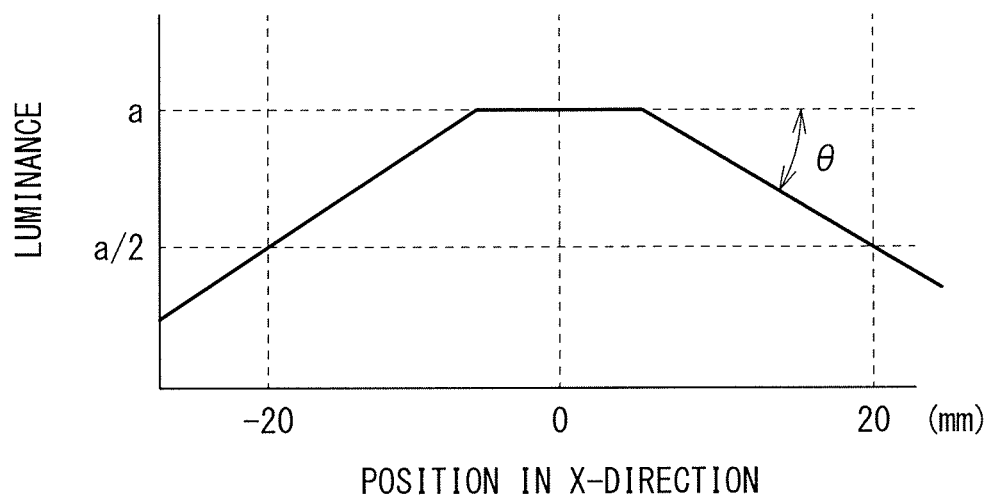
[ FIG. 21 ]
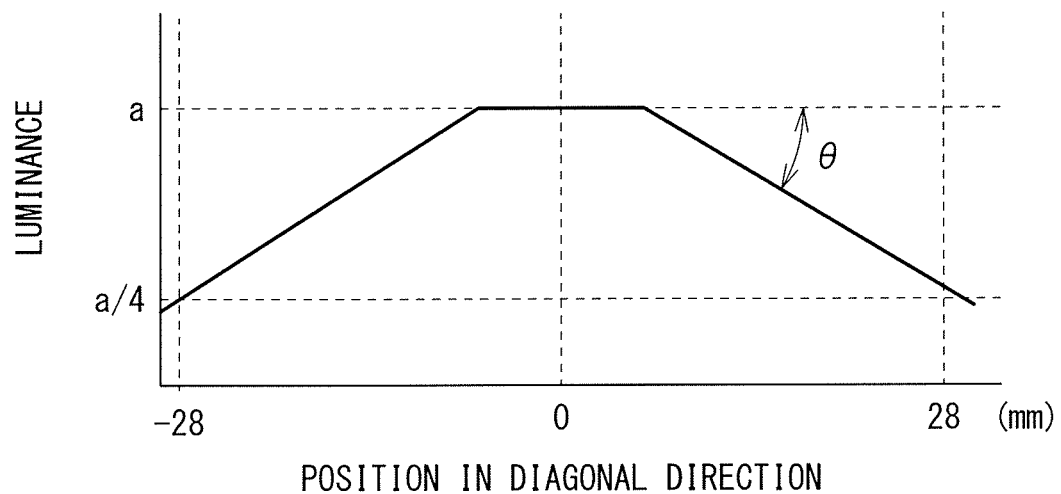

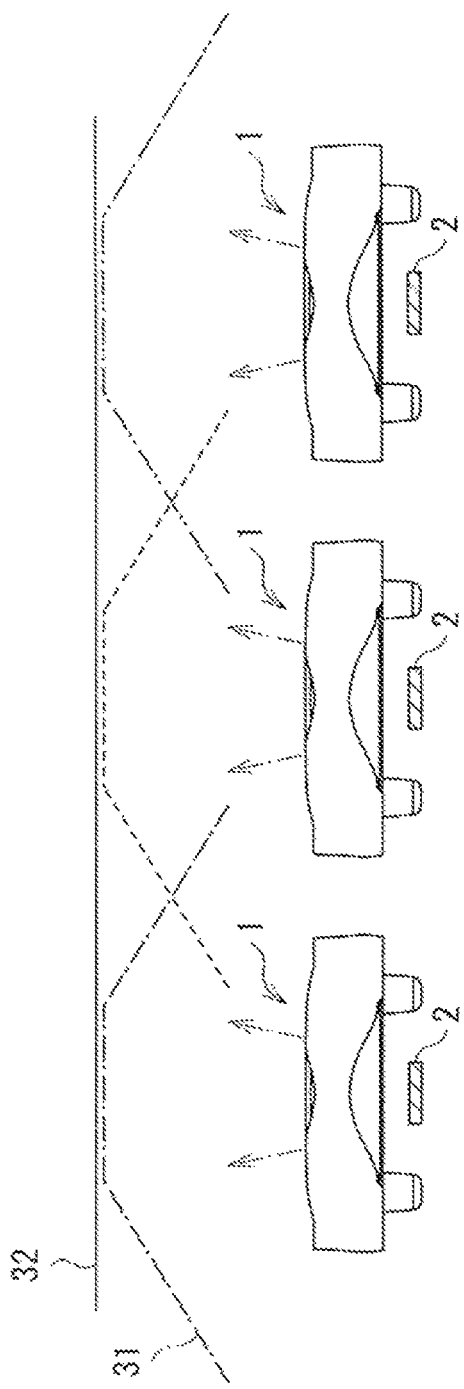
[ FIG. 22 ]

[ FIG. 23 ]
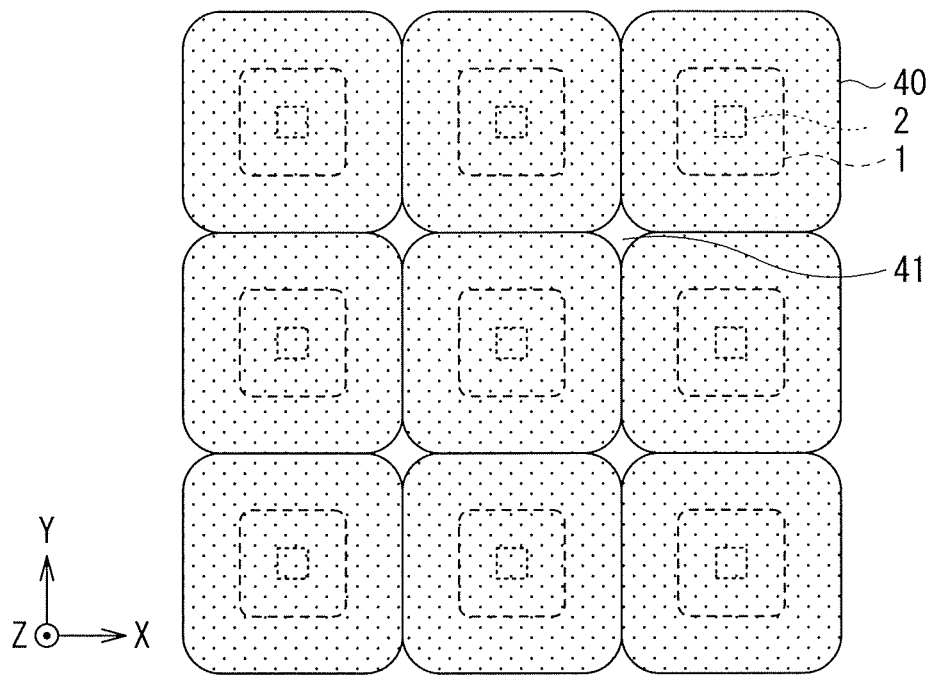
[ FIG. 24 ]
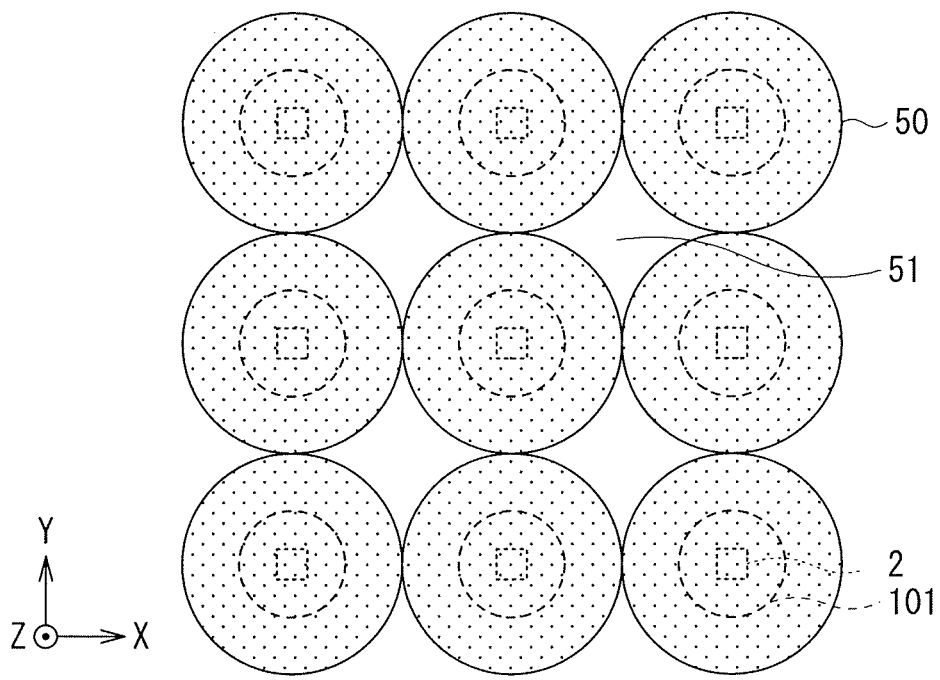

[ FIG. 25 ]
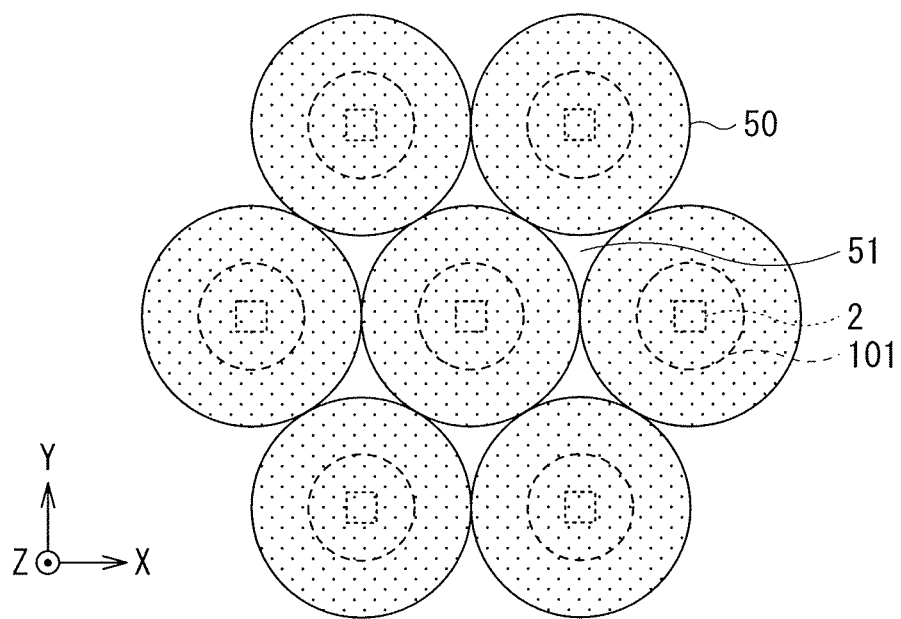

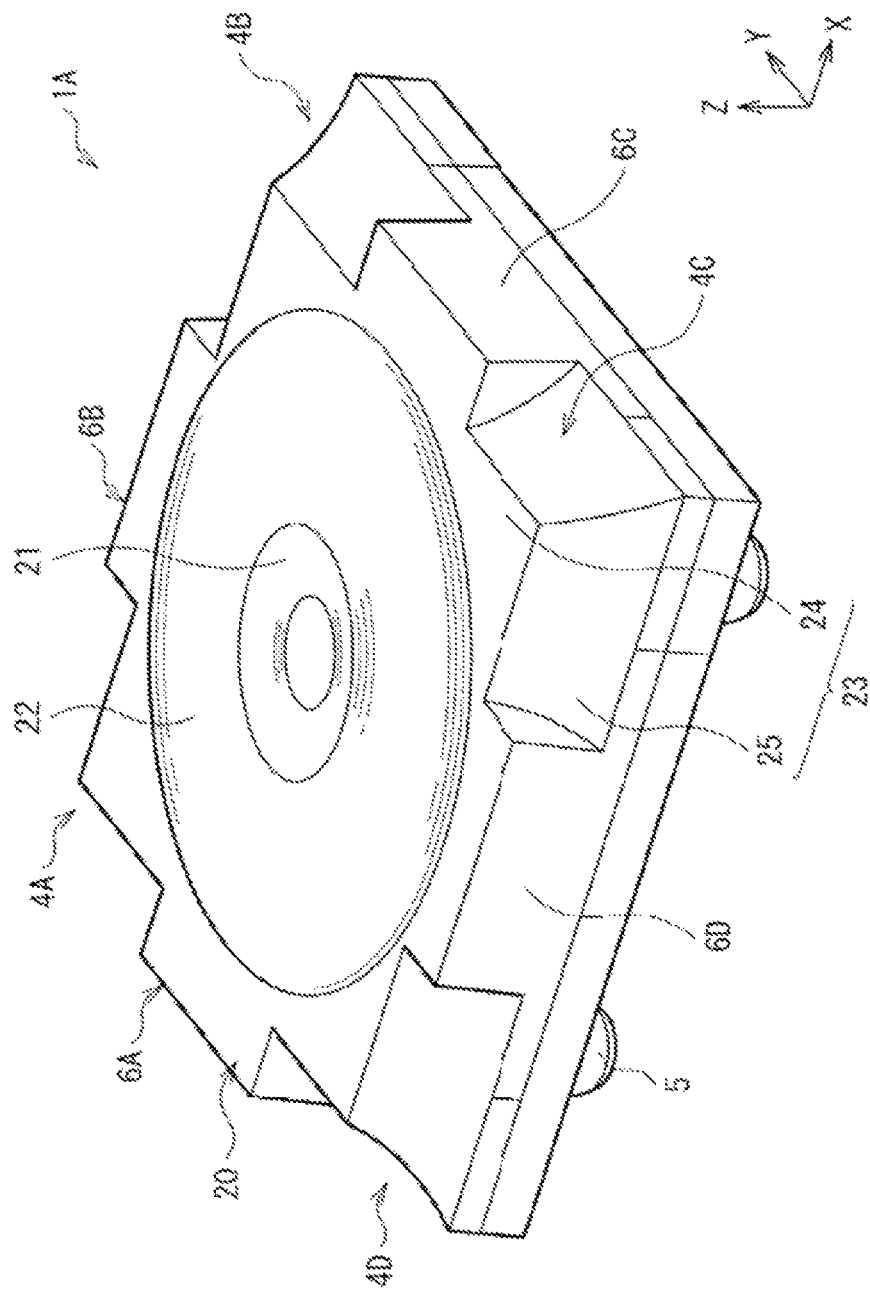
[ FIG. 20 ]

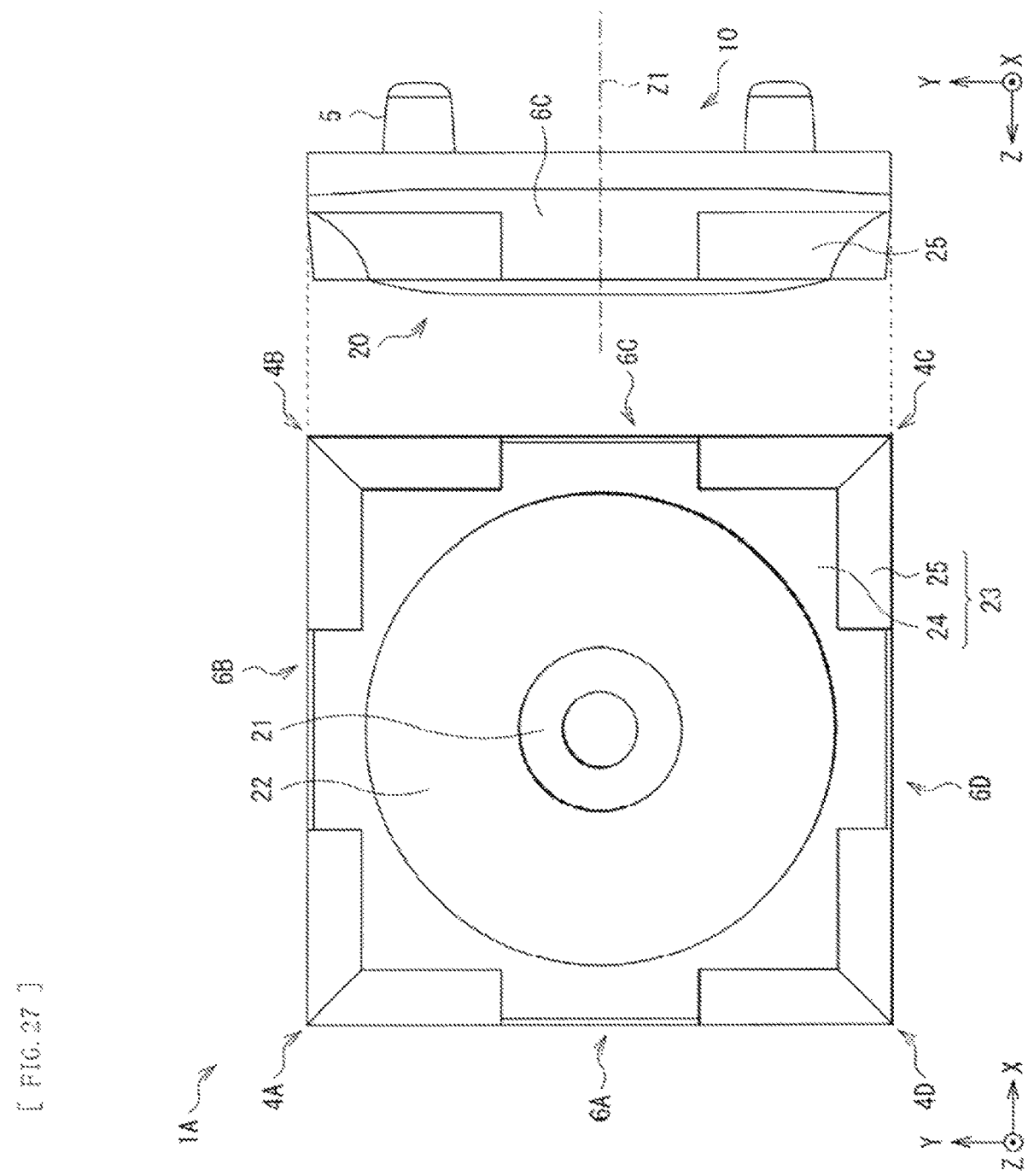
[ FIG. 27 ]

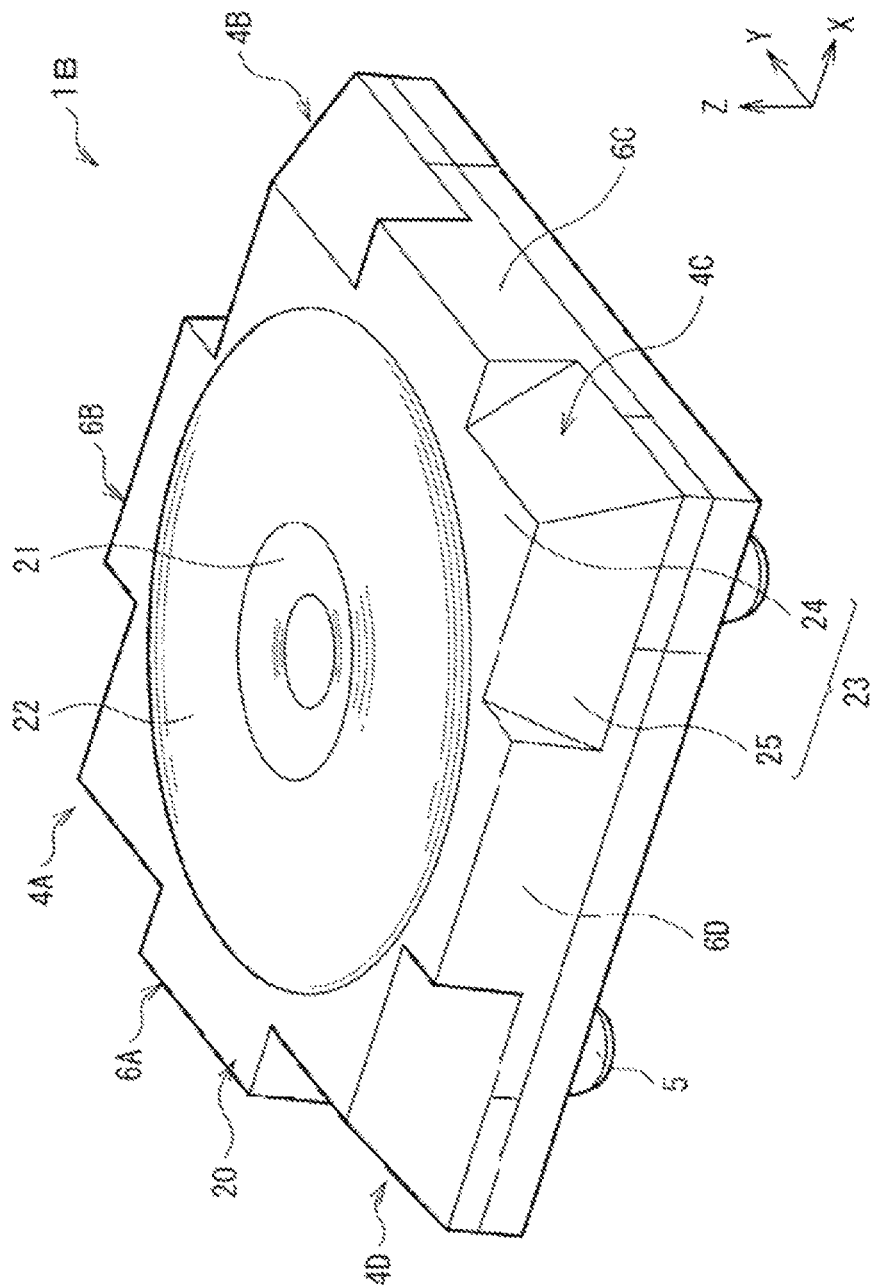
[FIG. 28]

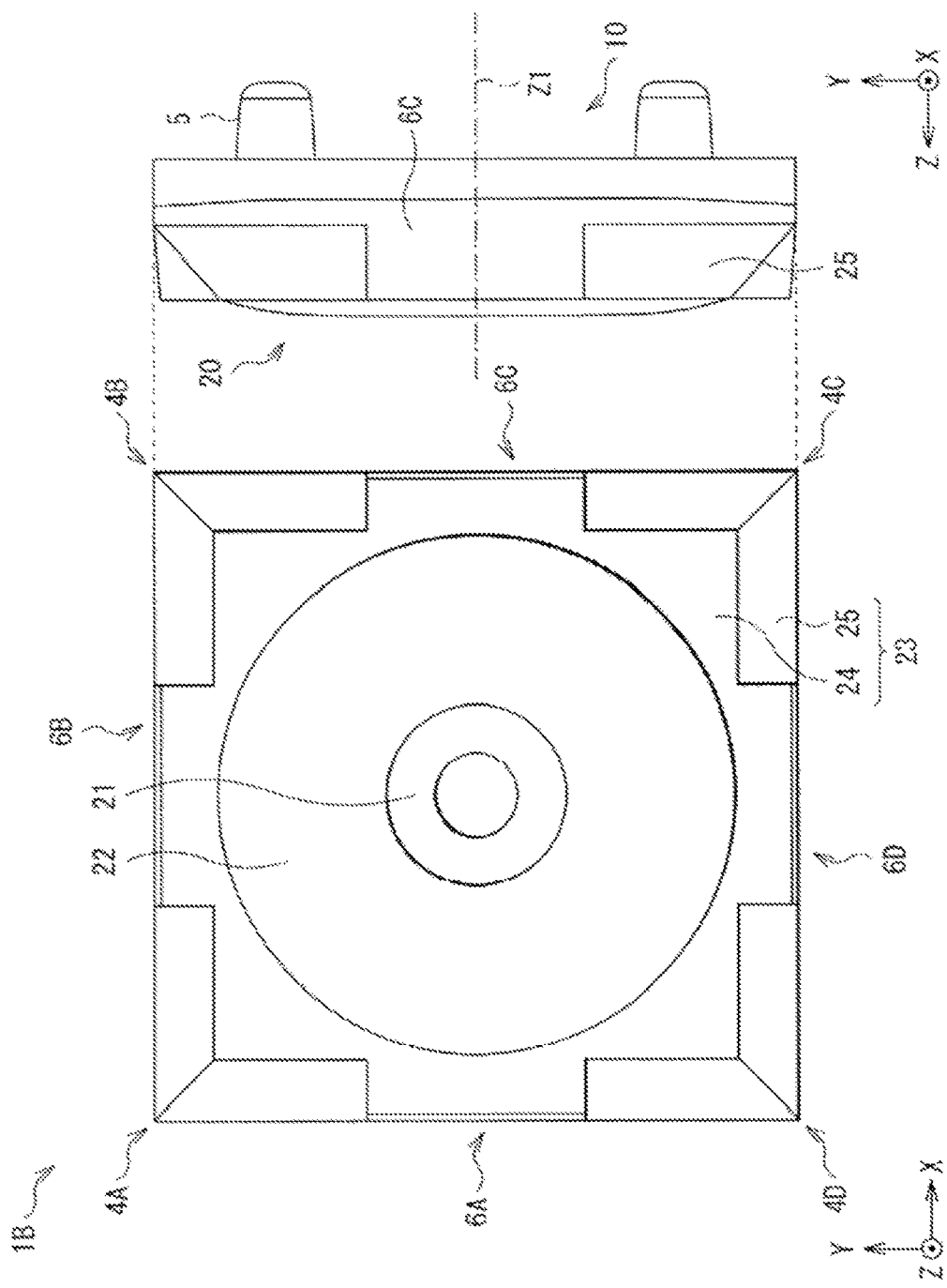

[ FIG. 30 ]
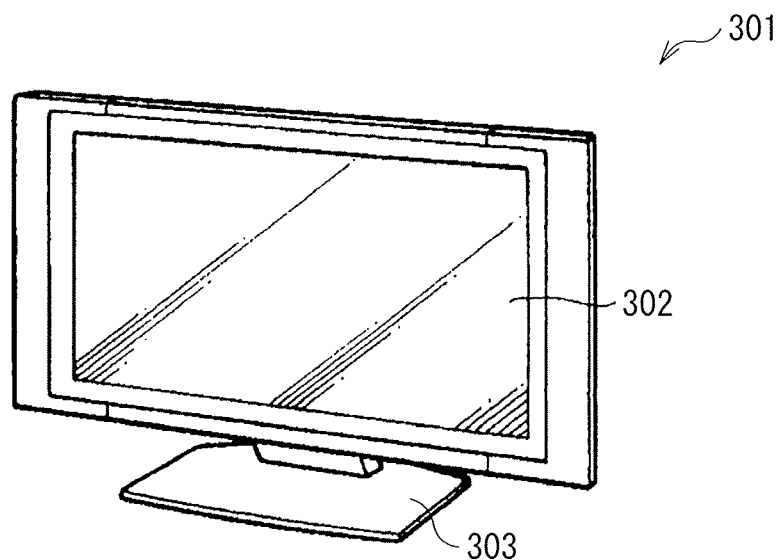
[ FIG. 31 ]
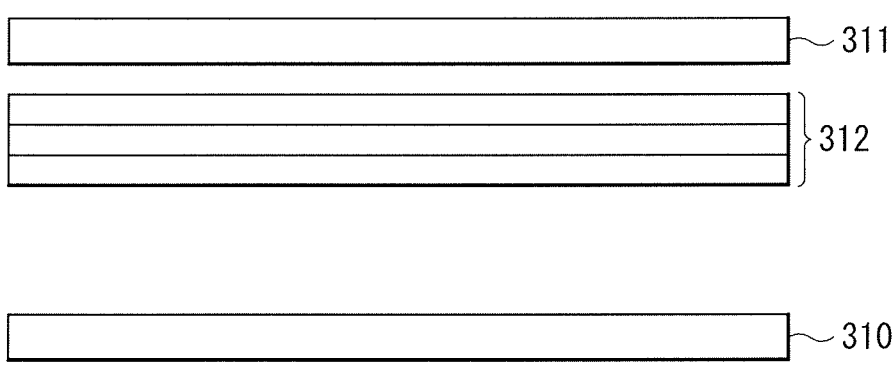

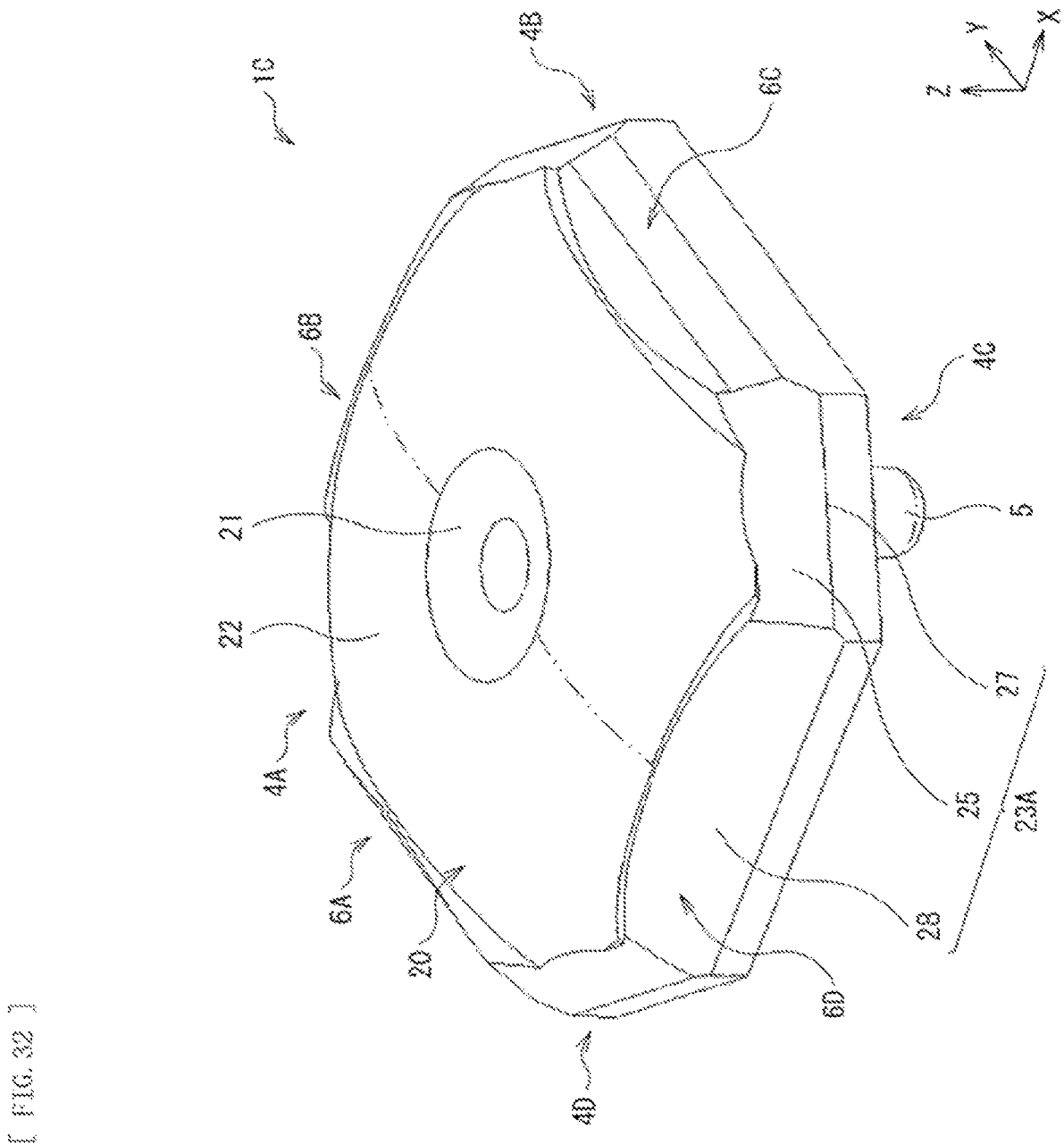
[FIG. 32]

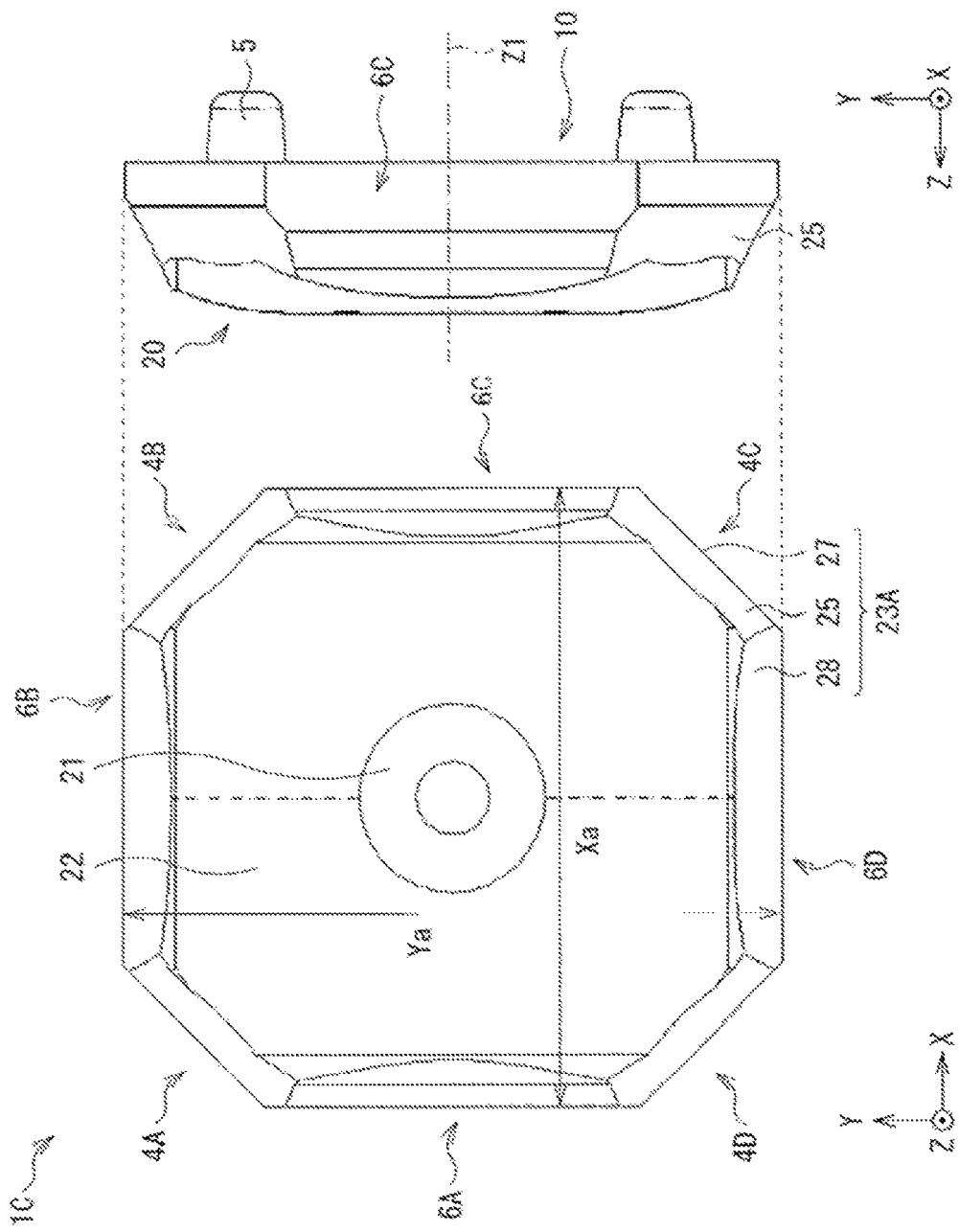
[FIG. 33]

[ FIG. 34 ]
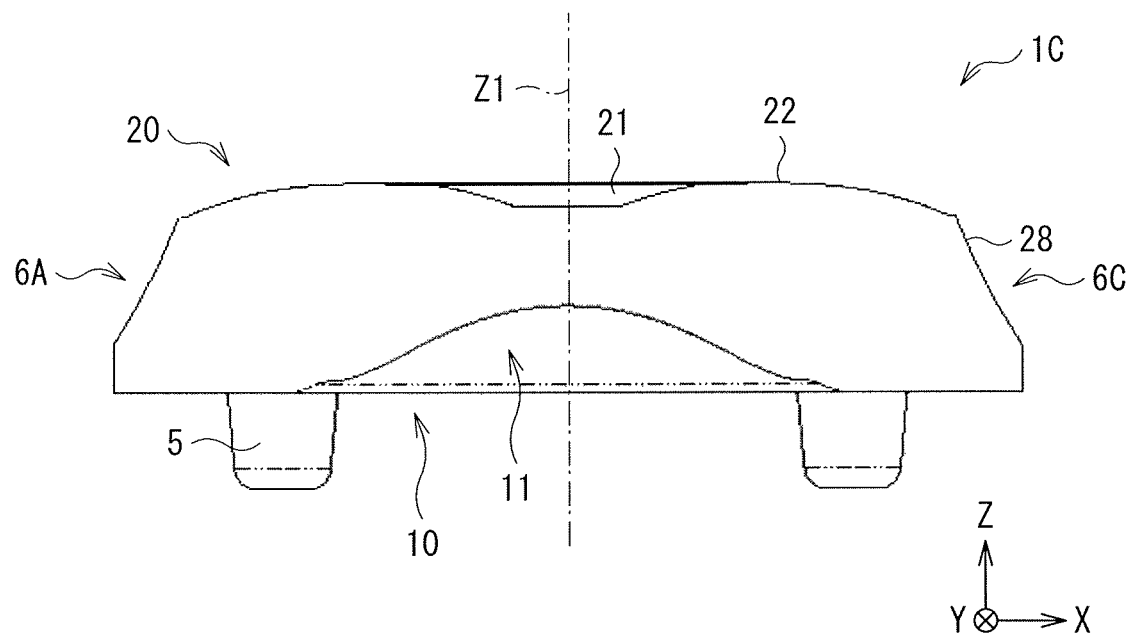

LIGHT SOURCE LENS, ILLUMINATION UNIT, AND DISPLAY UNIT

CROSS-REFERENCE TO RELATED APPLICATIONS

The present application is a continuation of U.S. patent application Ser. No. 17/081,009, filed on Oct. 27, 2020, which is a continuation of U.S. patent application Ser. No. 15/559,125, filed on Sep. 18, 2017 (now U.S. Pat. No. 10,852,456, issued on Dec. 1, 2020), which application is a national phase entry under 35 U.S.C. § 371 of International Application No. PCT/JP2016/057164, filed on Mar. 8, 2016, which claims priority from Japanese Patent Application No. 2015-073337, filed on Mar. 31, 2015, all of which are incorporated herein by reference.

TECHNICAL FIELD

The present disclosure relates to a light source lens suitable for a surface light source, an illumination unit, and a display unit that performs an image display using light illuminated by such an illumination unit.

BACKGROUND ART

A backlight system used for a unit such as a liquid crystal display unit includes a direct-lit back light system and an edge-lit backlight system. In recent years, a light emitting diode (LED) has often been used as a light source for such a backlight.

In a case where the LED is used as a light source, the direct-lit backlight system in which a plurality of LEDs are disposed enables a planar luminance distribution to be obtained as a whole. In this case, in order to efficiently utilize light from the LED, it has been known to dispose a light source lens that diffuses the light from the LED, as disclosed, for example, in PTL 1.

CITATION LIST

Patent Literature

PTL 1: Japanese Unexamined Patent Application Publication No. 2007-227410

SUMMARY OF INVENTION

The light source lens disclosed in PTL 1 has a substantially circular planar shape, and has a function of diffusing light from a center part toward a peripheral part in a cross-section including an optical axis. Accordingly, one light source in which the LED and the light source lens are combined allows for formation of a substantially circular luminance distribution in which luminance is decreased toward the peripheral part from the center part. In a case where a plurality of the light sources as described above are disposed to obtain the planar luminance distribution, it may be difficult to obtain an even luminance distribution as a whole.

It is therefore desirable to provide a light source lens that makes it possible to improve unevenness in a luminance distribution, an illumination unit, and a display unit.

A light source lens according to an embodiment of the present disclosure includes an incident surface and an exit surface. Light from a light-emitting device is incident on the incident surface. The exit surface has a diffusing function at a center part for light incident through the incident surface. The exit surface also has a light-condensing function at at least a portion of an intermediate part and a peripheral part for the light incident through the incident surface.

An illumination unit according to an embodiment of the present disclosure is provided with a light-emitting device and a light source lens. The light source lens includes an incident surface and an exit surface. Light from the light-emitting device is incident on the incident surface. The exit surface has a diffusing function at a center part for light incident through the incident surface. The exit surface also has a light-condensing function at at least a portion of an intermediate part and a peripheral part for the light incident through the incident surface.

A display unit according to an embodiment of the present disclosure is provided with an illumination unit and a display panel. The illumination unit has a light-emitting device and a light source lens. The display panel displays an image on a basis of illumination light from the illumination unit. The light source lens includes an incident surface and an exit surface. Light from the light-emitting device is incident on the incident surface. The exit surface has a diffusing function at a center part for light incident through the incident surface. The exit surface also has a light-condensing function at at least a portion of an intermediate part and a peripheral part for the light incident through the incident surface.

In the light source lens, the illumination unit, or the display unit according to the embodiment of the present disclosure, the incident light is diffused at the center part of the exit surface, and is condensed at at least a portion of the intermediate part and the peripheral part of the exit surface.

According to the light source lens, the illumination unit, or the display unit of the embodiment of the present disclosure, the incident light is diffused at the center part of the exit surface, and is condensed at at least a portion of the intermediate part and the peripheral part of the exit surface, thus making it possible to improve the unevenness in the luminance distribution.

It is to be noted that effects described herein are not necessarily limitative and may include any of effects described in the present disclosure.

BRIEF DESCRIPTION OF DRAWINGS

FIG. 1 is a perspective view of a configuration example of a light source lens according to an embodiment of the present disclosure.

FIG. 2 is an explanatory diagram that describes a cross-sectional configuration of the light source lens illustrated in FIG. 1.

FIG. 3 is a cross-sectional view of a configuration example of the light source lens along a cross-section ZX-Y1 in FIG. 2.

FIG. 4 is a cross-sectional view of a configuration example of the light source lens along a cross-section ZX-Y2 in FIG. 2.

FIG. 5 is a configuration diagram in which the cross-section of FIG. 3 and the cross-section of FIG. 4 are overlapped.

FIG. 6 is a plan view illustrating a planar configuration of the light source lens illustrated in FIG. 1, as viewed from above.

FIG. 7 is an explanatory diagram that describes a light-diffusing function and a light-condensing function of the light source lens illustrated in FIG. 1.

FIG. 8 illustrates a cross-section and a plan of a configuration example of a light source lens according to a first comparative example.

FIG. 9 is an explanatory diagram that describes a light-diffusing function of the light source lens according to the first comparative example.

FIG. 10 is an explanatory diagram that describes a light-condensing function in a depressed part of the light source lens illustrated in FIG. 1.

FIG. 11 is an explanatory diagram that describes a light-diffusing function of a light source lens according to a second comparative example.

FIG. 12 is a characteristic diagram illustrating an example of an illuminance distribution of a light-emitting device.

FIG. 13 is a characteristic diagram illustrating an example of a luminance distribution of a light-emitting device in a predetermined irradiation surface.

FIG. 14 is a characteristic diagram illustrating an example of an illuminance distribution formed by the light source lens illustrated in FIG. 1.

FIG. 15 is a characteristic diagram illustrating an example of a luminance distribution formed by the light source lens illustrated in FIG. 1 in a predetermined irradiation surface.

FIG. 16 is a characteristic diagram illustrating an example of the luminance distribution formed by the light source lens illustrated in FIG. 1 in the predetermined irradiation surface.

FIG. 17 is a characteristic diagram illustrating an example of a luminance distribution in a diagonal direction illustrated in FIG. 16.

FIG. 18 is a characteristic diagram illustrating an example of a luminance distribution formed by the light source lens according to the second comparative example illustrated in FIG. 11 in the predetermined irradiation surface.

FIG. 19 is a characteristic diagram illustrating an example of a luminance distribution in a diagonal direction illustrated in FIG. 18.

FIG. 20 is a characteristic diagram illustrating an example of a luminance distribution in an X-direction in a case where a substantially quadrangular luminance distribution is formed by the light source lens illustrated in FIG. 1 in the predetermined irradiation surface.

FIG. 21 is a characteristic diagram illustrating an example of a luminance distribution in a diagonal direction in a case where the substantially quadrangular luminance distribution is formed by the light source lens illustrated in FIG. 1 in the predetermined irradiation surface.

FIG. 22 is an explanatory diagram that describes an example in which a plurality of the light source lenses illustrated in FIG. 1 are disposed to form a substantially even luminance distribution in the predetermined irradiation surface.

FIG. 23 is an explanatory diagram that describes an example in which the plurality of the light source lenses illustrated in FIG. 1 are disposed to form a substantially quadrangular synthesized luminance distribution in the predetermined irradiation surface.

FIG. 24 is an explanatory diagram that describes an example of a synthesized luminance distribution formed in a case where a plurality of the light source lenses according to the first comparative example illustrated in FIG. 8 are disposed in a square array.

FIG. 25 is an explanatory diagram that describes an example of a synthesized luminance distribution formed in a case where a plurality of the light source lenses according to the first comparative example illustrated in FIG. 8 are disposed in a staggered array.

FIG. 26 is a perspective view of a configuration example of a light source lens according to a first modification example.

FIG. 27 illustrates a plan and a side elevation of a configuration example of the light source lens according to the first modification example.

FIG. 28 is a perspective view of a configuration example of a light source lens according to a second modification example.

FIG. 29 illustrates a plan and a side elevation of a configuration example of the light source lens according to the second modification example.

FIG. 30 is an external view of an example of a display unit.

FIG. 31 is a cross-sectional view of a configuration example of a display section of the display unit illustrated in FIG. 30.

FIG. 32 is a perspective view of a configuration example of a light source lens according to another embodiment.

FIG. 33 illustrates a plan and a side elevation of a configuration example of the light source lens illustrated in FIG. 32.

FIG. 34 is a cross-sectional view of a configuration example of the light source lens illustrated in FIG. 32.

DESCRIPTION OF EMBODIMENTS

Some embodiments of the present disclosure are described in detail below in the following order with reference to drawings.
1. Description of Light Source Lens
   1.1 Configuration (FIG. 1 to FIG. 6)
   1.2 Workings (FIG. 7 to FIG. 25)
   1.3 Effects
2. Modification Examples
   2.1 First Modification Example (FIG. 26 and FIG. 27)
   2.2 Second Modification Example (FIG. 28 and FIG. 29)
3. Example of Application to Display Unit (FIG. 30 and FIG. 31)
4. Another Embodiment (FIG. 32 to FIG. 34)

1. Description of Light Source Lens 1.1 Configuration

FIG. 1 to FIG. 6 each illustrate a configuration example of a light source lens 1 according to an embodiment of the present disclosure. It is to be noted that, in FIG. 1 to FIG. 6, a Z-axis is defined as an optical axis Z1, and a plane perpendicular to the optical axis Z1 is defined as an XY plane.

FIG. 1 and FIG. 2 each illustrate a configuration example of the light source lens 1 as viewed diagonally. FIG. 3 illustrates an example of a cross-sectional configuration of the light source lens 1 along a cross-section ZX-Y1 in FIG. 2. FIG. 4 illustrates an example of a cross-sectional configuration of the light source lens 1 along a cross-section ZX-Y2 in FIG. 2. FIG. 5 illustrates an example of a cross-sectional configuration in which the cross-section of FIG. 3 and the cross-section of FIG. 4 are overlapped. FIG. 6 illustrates an example of a planar configuration of the light source lens 1 as viewed from above.

As illustrated in FIG. 3, the light source lens 1 is provided for a light-emitting device 2 disposed on a substrate 3, for example. The light-emitting device 2 is a point light source, for example, and is specifically configured by an LED. The light source lens 1 is provided with an attachment part 5 on a bottom surface thereof, and is disposed over the substrate 3 at an interval with the attachment part 5 interposed in between. The light-emitting device 2 is disposed between the bottom surface of the light source lens 1 and the substrate 3.

The light source lens 1 includes an incident surface 10 on which light from the light-emitting device 2 is incident, and an exit surface 20 through which the light incident through the incident surface 10 exits to the outside. As illustrated in FIG. 1 and FIG. 6, in the light source lens 1, an outer shape including the incident surface 10 and the exit surface 20 is a quadrangular shape having four rounded corners 4A, 4B, 4C, and 4D as well as four linear sides 6A, 6B, 6C, and 6D, as viewed from an optical-axis direction.

The incident surface 10 is formed on the bottom surface of the light source lens 1. As illustrated in FIG. 3, the incident surface 10 has a central part 11 designed to have a concave shape, and has a diffusing function for light from the light-emitting device 2.

The exit surface 20 is formed on a top surface of the light source lens 1. The exit surface 20 has a diffusing function at a center part 21 for the light incident through the incident surface 10. The exit surface 20 has a light-condensing function at at least a portion of a peripheral part 23 and an intermediate part 22. On the exit surface 20, the center part 21 is designed to have a concave shape that allows for the diffusing function for the incident light. The intermediate part 22 has an aspherical shape that allows for the light-condensing function for the incident light. As illustrated in FIG. 1 and FIG. 6, the center part 21 and the intermediate part 22 each have a circular planar shape as viewed from the optical-axis direction.

The peripheral part 23 includes a flat part 24, a depressed part 25 having the light-condensing function for the incident light, and a curved part 26. The peripheral part 23 has a quadrangular shape having the four rounded corners 4A, 4B, 4C, and 4D as well as the four linear sides 6A, 6B, 6C, and 6D, as viewed from the optical-axis direction. The depressed part 25 is formed near each of the four corners 4A, 4B, 4C, and 4D. As illustrated in FIG. 1 and FIG. 4, the depressed part 25 is shaped to be inclined in a curved manner with respect to the flat part 24. The flat part 24 is formed near each of the four corners 4A, 4B, 4C, and 4D excluding the depressed part 25, and near each of the four sides 6A, 6B, 6C, and 6D.

1.2 Workings

Description of Diffusing Function and Light-Condensing Function in Light Source Lens 1

The light source lens 1 has two functions of diffusion and light condensing, in which the light source lens 1 diffuses light by the concave shape of the center part 21 of the exit surface 20, while condensing light at the intermediate part 22 and the peripheral part 23.

FIG. 7 illustrates the light-diffusing function and the light-condensing function of the light source lens 1 illustrated in FIG. 1 at the center part 21 and the intermediate part 22. As illustrated in FIG. 7, the light source lens 1 has the diffusing function for beams L1 and L2 passing through the center part 21 of the exit surface 20. Further, the light source lens 1 has the light-condensing function for a beam L3 passing through the intermediate part 22 of the exit surface 20. Accordingly, there is a region of intersection of the beam L2 having passed through the center part 21 and the beam L3 having passed through the intermediate part 22, between a predetermined irradiation surface 30 and the exit surface 20.

Here, FIG. 8 illustrates a configuration example of a light source lens 101 according to a first comparative example. Further, FIG. 9 illustrates a light-diffusing function of the light source lens 101 according to the first comparative example. As with the light source lens 1, the light source lens 101 is provided for the light-emitting device 2 disposed on the substrate 3, for example. The light source lens 101 is provided with an attachment part 105 on a bottom surface thereof, and is disposed over the substrate 3 at an interval with the attachment part 105 interposed in between. The light-emitting device 2 is disposed between the bottom surface of the light source lens 101 and the substrate 3.

The light source lens 101 includes an incident surface 110 on which light from the light-emitting device 2 is incident, and an exit surface 120 through which the light incident through the incident surface 110 exits to the outside. In the light source lens 101, an outer shape including the incident surface 110 and the exit surface 120 is a circular shape as viewed from the optical-axis direction.

The incident surface 110 has a central part 111 designed to have a concave shape, and has the diffusing function for the light from the light-emitting device 2. The exit surface 120 has the diffusing function for the light incident through the incident surface 110, at a center part 121, an intermediate part 122, and a peripheral part 123.

FIG. 9 illustrates beams L11 and L12 passed through the center part 121 of the exit surface 120 of the light source lens 101, and a beam L13 passed through the intermediate part 122. As appreciated from comparison between FIG. 7 and FIG. 9, the light source lens 1 according to the present embodiment and the light source lens 101 according to the first comparative example differ largely from each other in the function for the incident light.

Next, FIG. 10 illustrates a light-condensing function in the depressed part 25 of the light source lens 1. Further, FIG. 11 illustrates a light-diffusing function of a light source lens 201 according to a second comparative example. The light source lens 201 illustrated in FIG. 11 is a configuration example in which there is no depressed part 25 near each of the four corners 4A, 4B, 4C, and 4D, with the flat part 24 being provided instead, unlike the light source lens 1 according to the present embodiment.

In a case where no depressed part 25 is provided, the exit surface 20 has the diffusing function for a beam L10 passing near each of the four corners 4A, 4B, 4C, and 4D as illustrated in FIG. 11. In contrast, in the light source lens 1 according to the present embodiment, providing the depressed part 25 allows the exit surface 20 to have the light-condensing function for the beam L10 passing near each of the four corners 4A, 4B, 4C, and 4D.

Description of Luminance Distribution

In the light source lens 1 according to the present embodiment, it is possible to form a substantially quadrangular luminance distribution in the predetermined irradiation surface 30 by light having exited from the exit surface 20.

FIG. 12 illustrates an example of an illuminance distribution of the light-emitting device 2 alone along a cross-section ZX including the optical axis Z. Further, FIG. 13 illustrates an example of a luminance distribution of the light-emitting device 2 alone on the predetermined irradiation surface 30. As illustrated in FIG. 13, the light-emitting device 2 alone forms a substantially circular luminance distribution.

FIG. 14 illustrates an example of an illuminance distribution formed by the light source lens 1 along the cross-section ZX including the optical axis Z. FIG. 15 illustrates an example of a luminance distribution formed by the light source lens 1 in the predetermined irradiation surface 30. As illustrated in FIG. 15, the light source lens 1 enables the substantially circular luminance distribution to be close to the substantially quadrangular luminance distribution.

Description is next given of an influence of providing the depressed part 25 near each of the four corners 4A, 4B, 4C, and 4D, on the luminance distribution, with reference to FIG. 16 to FIG. 19.

FIG. 16 illustrates an example of the luminance distribution formed by the light source lens 1 in the predetermined irradiation surface 30. Further, FIG. 17 illustrates an example of a luminance distribution in a diagonal direction illustrated in FIG. 16. In contrast, FIG. 18 illustrates an example of a luminance distribution formed by the light source lens 201 (configuration in which no depressed part 25 is provided) according to the second comparative example illustrated in FIG. 11 in the predetermined irradiation surface 30. FIG. 19 illustrates an example of a luminance distribution in a diagonal direction illustrated in FIG. 18.

As illustrated in FIG. 17, in the light source lens 1 provided with the depressed part 25, a position at which a peak luminance "a" is decreased to one fourth in the diagonal direction is a position of ±28 millimeters from the center. Further, in the light source lens 1, there is a region where the luminance at the central part is substantially flat in the diagonal direction. In contrast, as illustrated in FIG. 19, in the light source lens 201 according to the second comparative example in which no depressed part 25 is provided, the position at which the peak luminance "a" is decreased to one fourth in the diagonal direction is a position of ±26 millimeters from the center. Further, in the light source lens 201, there is no such a region where the luminance is substantially flat, as compared with the light source lens 1. It is appreciated, from these results, that providing the depressed part 25 enables a shape of the luminance distribution in the predetermined irradiation surface 30 to be closer to a quadrangular shape.

FIG. 20 illustrates an example of a luminance distribution in an X-direction in a case where the substantially quadrangular luminance distribution as illustrated in FIG. 16 is formed by the light source lens 1 in the predetermined irradiation surface 30. FIG. 21 illustrates an example of a luminance distribution in the diagonal direction in a case where the substantially quadrangular luminance distribution as illustrated in FIG. 16 is formed by the light source lens 1 in the predetermined irradiation surface 30.

Description is given, as a specific example, of a case where the substantially quadrangular luminance distribution is formed in an illumination range of 40 millimeters square. As illustrated in FIG. 20, it is preferable to set a position at which the peak luminance "a" is decreased to one half in the X-direction to a position of ±20 millimeters from the center. Further, as illustrated in FIG. 21, it is preferable to set the position at which the peak luminance "a" is decreased to one fourth in the diagonal direction to a position of ±28 millimeters from the center.

Description of Synthesized Luminance Distribution in a Case of Using a Plurality of Light-Emitting Devices 2 and a Plurality of Light Source Lenses 1

It is conceivable that a plurality of light-emitting devices 2 and a plurality of light source lenses 1 be used to configure a backlight of a display unit, for example. Further, it is conceivable that partial driving be performed that independently controls the plurality of light emitting devices 2 for light emission in a case of the application thereof to the backlight of the display unit.

FIG. 22 illustrates an example in which the plurality of light-emitting devices 2 and the plurality of light source lenses 1 are disposed to form a substantially even luminance distribution in the predetermined irradiation surface 30. A combination of one light-emitting device 2 and one light source lens 1 forms one luminance distribution 31. By disposing the plurality of light-emitting devices 2 and the plurality of light source lenses 1 to partially overlap respective illumination ranges at corresponding proper positions where the luminance is lowered, it becomes possible to form a substantially even synthesized luminance distribution 32 as a whole.

Here, in one illumination range formed by the combination of one light-emitting device 2 and one light source lens 1, a rate at which the luminance is decreased from the peak luminance "a" to the luminance of one half or to the luminance of one fourth is defined as an angle θ, as illustrated in FIG. 20 and FIG. 21. The angle θ may be appropriately optimized by factors such as a shape of the exit surface 20 of the light source lens 1. Further, in a case of application of the plurality of light-emitting devices 2 and the plurality of light source lenses 1 to the backlight of the display unit, for example, the angle θ may be optimized depending on an effect of the partial driving and a preference for a displayed image. For example, when the angle θ is too small, the illumination range of one light source lens 1 is expanded too much, thus causing a possibility that the effect of the partial driving may be attenuated in association with the illumination range of an adjacent light source lens 1. Further, when the angle θ is too large, for example, it may be possibly difficult to control the image to be displayed in a desired manner.

FIG. 23 illustrates an example in which the plurality of light source lenses 1 are disposed to form a substantially quadrangular synthesized luminance distribution in the predetermined irradiation surface 30. The combination of one light-emitting device 2 and one light source lens 1 enables a substantially quadrangular luminance distribution 40 to be obtained. Therefore, a square array of the plurality of light-emitting devices 2 and the plurality of light source lenses 1 allows for formation of the substantially quadrangular synthesized luminance distribution as a whole in the predetermined irradiation surface 30. In this case, the luminance distribution 40 formed by one light source lens 1 is substantially quadrangular, thus making it possible to reduce a region where an uneven luminance part 41 is generated, as a whole.

FIG. 24 illustrates an example of a synthesized luminance distribution formed in a case where a plurality of light source lenses 101 according to the first comparative example illustrated in FIG. 8 are disposed in a square array. In the configuration of the first comparative example, a combination of one light-emitting device 2 and one light source lens 101 allows for formation of a substantially circular luminance distribution 50. Therefore, in a case where the plurality of light-emitting devices 2 and the plurality of light source lenses 101 are squarely arrayed to try to form a planar synthesized luminance distribution, a region where an uneven luminance part 51 is generated results in being large as a whole.

In contrast, FIG. 25 illustrates an example of a synthesized luminance distribution formed in a case where the plurality of light source lenses 101 according to the first comparative example are disposed in a staggered array. Adopting the staggered array makes it possible to reduce the region where the uneven luminance part 51 is generated, as compared with the case of the square array. However, the region where the uneven luminance part 51 is generated becomes larger than that of the uneven luminance part 41 illustrated in FIG. 23 in the case of using the light source lens 1 according to the present embodiment.

1.3. Effects

As described above, according to the present embodiment, the exit surface 20 is configured to diffuse the incident light at the center part 21, and to condense the incident light at at least a portion of the intermediate part 22 and the peripheral part 23, thus making it possible to improve the unevenness in the luminance distribution.

Use of the light source lens 1 according to the present embodiment makes it possible to achieve a surface light source with less luminance unevenness, with a small number of the light-emitting devices 2. Further, appropriately optimizing magnification of the lens allows for wider illumination range of one light source lens 1, thus making it possible to reduce the number of the light-emitting devices 2. Furthermore, unlike the case of using the light-emitting device 2 alone, and unlike a lens of a type that allows for diffusion of light to a periphery, such as the light source lens 101 according to the first comparative example 1 illustrated in FIG. 8, the light source lens 1 suppresses expansion of light. Therefore, even in a case of performing such a partial driving where the plurality of light-emitting devices 2 are disposed to cause only a portion of the light-emitting devices 2 to emit light, for example, it is possible to enhance a contrast ratio.

It is to be noted that the effects described hereinabove are mere examples, and are not limited thereto; the disclosure may also include other effects. The same holds true also for another embodiment described hereinafter.

2. Modification Examples

Description is given next of modification examples of the above-described light source lens 1. Hereinafter, description of components and functions similar to those of the above-described light source lens 1 is omitted where appropriate.

2.1 First Modification Example

FIG. 26 illustrates a configuration example of a light source lens 1A according to a first modification example, as viewed diagonally. FIG. 27 illustrates an example of a planar configuration of the light source lens 1A as viewed from above, and a configuration example of the light source lens 1A as viewed laterally.

The configuration of the light source lens 1A according to the first modification example differs from that of the above-described light source lens 1 illustrated in FIG. 1 to FIG. 6 in the configuration of the four corners 4A, 4B, 4C, and 4D. In the light source lens 1, the outer shape including the incident surface 10 and the exit surface 20 is designed to be a shape having the four rounded corners 4A, 4B, 4C, and 4D as viewed from the optical-axis direction. This allows the peripheral part 23 to be configured to have the curved part 26 at each of the four corners 4A, 4B, 4C, and 4D. In contrast, the light source lens 1A according to the first modification example has a configuration in which each of the four corners 4A, 4B, 4C, and 4D is not provided with the curved part 26. Accordingly, in the light source lens 1A according to the first modification example, the outer shape including the incident surface 10 and the exit surface 20 is designed to be a shape having four corners 4A, 4B, 4C, and 4D that are not rounded as viewed from the optical-axis direction.

Other configurations may be substantially similar to those of the light source lens 1 illustrated in FIG. 1 to FIG. 6.

2.2 Second Modification Example

FIG. 28 illustrates a configuration example of a light source lens 1B according to a second modification example, as viewed diagonally. FIG. 29 illustrates an example of a planar configuration of the light source lens 1B as viewed from above, and a configuration example of the light source lens 1B as viewed laterally.

As with the above-described light source lens 1A according to the first modification example, the light source lens 1B according to the second modification example has a configuration in which each of the four corners 4A, 4B, 4C, and 4D is not provided with the curved part 26; the outer shape including the incident surface 10 and the exit surface 20 is designed to be a shape having the four corners 4A, 4B, 4C, and 4D that are not rounded as viewed from the optical-axis direction.

Further, the configuration of the light source lens 1B according to the second modification example differs from that of the above-described light source lens 1 illustrated in FIG. 1 to FIG. 6 in the shape of the depressed part 25. In the light source lens 1, the depressed part 25 is shaped to be inclined in a curved manner with respect to the flat part 24 as illustrated in FIG. 1 and FIG. 4. In contrast, in the light source lens 1B according to the second modification example, the depressed part 25 is shaped to be inclined linearly with respect to the flat part 24.

Other configurations may be substantially similar to those of the light source lens 1 illustrated in FIG. 1 to FIG. 6.

3. Example of Application to Display Unit

An illumination unit may be configured by any of the above-described light source lenses 1, 1A, and 1B. Further, an image display may be performed using light illuminated by such an illumination unit.

FIG. 30 illustrates a configuration example of a display unit 301. The display unit 301 includes a display section 302 and a stand 303.

As illustrated in FIG. 31, for example, the display section 302 includes an illumination unit 310, a display panel 311, and an optical sheet 312. The display panel 311 is, for example, a transmissive liquid crystal display panel, and displays an image on the basis of illumination light from the illumination unit 310 that is used as a backlight.

The illumination unit 310 is a planar light source. As illustrated in FIG. 22 and FIG. 23, for example, the illumination unit 310 includes a plurality of light-emitting devices 2 disposed in matrix, and a plurality of light source lenses 1 disposed in matrix so as to correspond, respectively, to the plurality of light-emitting devices 2.

The optical sheet 312 is disposed between the illumination unit 310 and the display panel 311. The optical sheet 312 is made of, for example, a sheet or a film allowing for enhancement in luminance. Further, the optical sheet 312 may include a prism sheet, for example. The optical sheet 312 may also include a reflective polarizing film such as a dual brightness enhancement film (DBEF).

4. Another Embodiment

The technology according to an embodiment of the present disclosure is not limited to the foregoing embodiment, and may be implemented in various modified manners.

For example, the above-described light source lenses 1, 1A, and 1B each have a shape in which the cross-section in the X-direction and the cross-section in the Y-direction are substantially symmetrical; however, the cross-section in the X-direction and the cross-section in the Y-direction may be asymmetric.

FIG. 32 illustrates a configuration example of a light source lens 1C according to another embodiment, as viewed diagonally. FIG. 33 illustrates an example of a planar configuration of the light source lens 1C as viewed from above, and a configuration example of the light source lens 1C as viewed laterally. FIG. 34 illustrates an example of a cross-sectional configuration of the light source lens 1C.

The configuration of the light source lens 1C differs from that of the above-described light source lens 1 illustrated in FIG. 1 to FIG. 6 in the configuration of the peripheral part 23A. In the light source lens 1C, the curved part 26 at each of the four corners 4A, 4B, 4C, and 4D is replaced by a linear part 27 formed linearly. This allows the outer shape including the incident surface 10 and the exit surface 20 to be a substantially octagonal shape as viewed from the optical-axis direction, as illustrated in FIG. 33.

Further, unlike the configuration of the above-described light source lens 1 illustrated in FIG. 1 to FIG. 6, the light source lens 1C has a shape in which substantially the entire region of the peripheral part 23A is inclined, with the flat part 24 at the peripheral part 23 being eliminated. This allows the depressed part 25 to be formed at each of the four corners 4A, 4B, 4C, and 4D, and allows a depressed part 28 to be formed at each of the four sides 6A, 6B, 6C, and 6D. It is to be noted that the depressed parts 25 and 28 may each have a shape that is inclined in a curved manner with a curvature; alternatively, the depressed parts 25 and 28 may each have a linearly inclined shape, substantially similar to the above-described light source lens 1B according to the second modification example.

Furthermore, as illustrated in FIG. 33, the light source lens 1C may have a configuration in which a diameter Xa in the X-direction and a diameter Ya in the Y-direction are different in their sizes.

Moreover, for example, the present technology may adopt the following configurations.

(1)
A light source lens including:
an incident surface on which light from a light-emitting device is incident; and
an exit surface that has a diffusing function at a center part for light incident through the incident surface, and a light-condensing function at at least a portion of an intermediate part and a peripheral part for the light incident through the incident surface.

(2)
The light source lens according to (1), in which
the center part of the exit surface has a concave shape that allows for the diffusing function for the incident light,
the intermediate part of the exit surface has an aspherical shape that allows for the light-condensing function for the incident light, and
the peripheral part of the exit surface includes a flat part and a depressed part that allows for the light-condensing function for the incident light.

(3)
The light source lens according to (2), in which
the peripheral part has a quadrangular planar shape having four corners or four rounded corners as viewed from an optical-axis direction, and
the depressed part is formed near each of the four corners.

(4)
The light source lens according to (2) or (3), in which the center part and the intermediate part each have a circular planar shape as viewed from an optical-axis direction.

(5)
The light source lens according to any one of (1) to (4), in which the incident surface has an aspherical shape that allows for the diffusing function for the light from the light-emitting device.

(6)
The light source lens according to any one of (1) to (5), in which
an outer shape including the incident surface and the exit surface is a quadrangular shape having four corners or four rounded corners as viewed from an optical-axis direction.

(7)
The light source lens according to any one of (1) to (6), in which light exited from the exit surface forms a quadrangular luminance distribution in a predetermined irradiation surface.

(8)
An illumination unit provided with a light-emitting device and a light source lens, the light source lens including:
an incident surface on which light from the light-emitting device is incident; and
an exit surface that has a diffusing function at a center part for light incident through the incident surface, and a light-condensing function at at least a portion of an intermediate part and a peripheral part for the light incident through the incident surface.

(9)
The illumination unit according to (8), in which
the light-emitting device includes a plurality of light-emitting devices, and
the light source lens includes a plurality of light source lenses that are provided respectively for the plurality of light-emitting devices.

(10)
The illumination unit according to (9), in which synthesized light of pieces of light that are exited from respective exit surfaces of the plurality of light source lenses forms a quadrangular synthesized luminance distribution in a predetermined irradiation surface.

(11)
A display unit provided with an illumination unit and a display panel, the illumination unit having a light-emitting device and a light source lens, the display panel displaying an image on a basis of illumination light from the illumination unit, the light source lens including:
an incident surface on which light from the light-emitting device is incident; and
an exit surface that has a diffusing function at a center part for light incident through the incident surface, and a light-condensing function at at least a portion of an intermediate part and a peripheral part for the light incident through the incident surface.

This application is based upon and claims the benefit of priority of the Japanese Patent Application No. 2015-073337 filed with the Japan Patent Office on Mar. 31, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display unit comprising:
a display section having an illumination unit;
a display panel in front of the illumination unit; and
an optical sheet between the display panel and illumination unit;
wherein the illumination unit comprises a light-emitting device and a light source lens, wherein the light source lens comprises:
an incident surface on which light from the light-emitting device is incident, and
an exit surface having a concave center part aligned with the incident surface, and
a peripheral part having a shape in which an entire region of the peripheral part is inclined and has a substantially quadrangular shape as viewed from an optical-axis direction;
wherein the exit surface has a diffusing function for a beam passing through regions of corners of the lens;
wherein, in combination with the incident surface, the center part has a diffusing function for light incident through the incident surface, an intermediate part surrounding the concave center part has a light-condensing function for light incident through the incident surface, and the peripheral part has a light-condensing function for light incident through the incident surface.

2. The display unit according to claim 1, wherein
the concave center part has a concave shape that allows for the diffusing function for the incident light,
the peripheral part of the exit surface has a curved section providing the light-condensing function for the incident light, and
the peripheral part of the exit surface includes a flat part, the curved section terminating into the flat part.

3. The display unit according to claim 2, wherein
the substantially quadrangular shape has four rounded corners as viewed from the optical-axis direction.

4. The display unit according to claim 3, wherein
the peripheral part has a depressed part formed near each of the four corners.

5. The display unit according to claim 2, wherein
the center part and the intermediate part each have a circular planar shape as viewed from an optical-axis direction.

6. The display unit according to claim 2, wherein
the incident surface has an aspherical shape that allows for diffusion of the light from the light-emitting device.

7. The display unit according to claim 2, wherein light exited from the exit surface forms a quadrangular luminance distribution in a predetermined irradiation surface.

8. The display unit according to claim 2, wherein
the light-emitting device is an LED.

9. The display unit according to claim 1, wherein
the substantially quadrangular shape has four rounded corners as viewed from the optical-axis direction.

10. The display unit according to claim 9, wherein
the peripheral part has a depressed part formed near each of the four corners.

11. The display unit according to claim 1, wherein
the center part and the intermediate part each have a circular planar shape as viewed from an optical-axis direction.

12. The display unit according to claim 1, wherein
the optical sheet is a luminance enhancement sheet.

13. The display unit according to claim 1, wherein
the optical sheet is a prism sheet.

14. The display unit according to claim 1, wherein
the optical sheet is a reflective polarizing film.

15. The display unit according to claim 1, wherein
the incident surface has an aspherical shape that allows for diffusion of the light from the light-emitting device.

16. The display unit according to claim 1, wherein
the light source lens includes an outer shape including the incident surface and the exit surface and has a substantially quadrangular shape having four corners as viewed from the optical-axis direction.

17. The display unit according to claim 1, wherein
the light source lens includes an outer shape including the incident surface and the exit surface and has a substantially quadrangular shape having four rounded corners as viewed from the optical-axis direction.

18. The display unit according to claim 1, wherein light exited from the exit surface forms a quadrangular luminance distribution in a predetermined irradiation surface.

19. The display unit according to claim 1, wherein
the display panel is a liquid crystal display panel.

20. The display unit according to claim 1, wherein
the light-emitting device is an LED.

* * * * *